(12) United States Patent
Anderson et al.

(10) Patent No.: US 11,530,944 B1
(45) Date of Patent: Dec. 20, 2022

(54) WELL FLUID MANAGEMENT SYSTEMS AND METHODS

(71) Applicant: COVENANT TESTING TECHNOLOGIES, LLC, Sugar Land, TX (US)

(72) Inventors: Paul Anderson, Houston, TX (US); Michael W Joacim, Tomball, TX (US)

(73) Assignee: Covenant Testing Technologies, LLC, The Woodlands, TX (US)

( * ) Notice: Subject to any disclaimer, the term of this patent is extended or adjusted under 35 U.S.C. 154(b) by 408 days.

(21) Appl. No.: 16/846,243

(22) Filed: Apr. 10, 2020

Related U.S. Application Data

(63) Continuation-in-part of application No. 16/804,250, filed on Feb. 28, 2020, now Pat. No. 10,717,026.

(60) Provisional application No. 62/849,158, filed on May 17, 2019, provisional application No. 62/849,226, filed on May 17, 2019, provisional application No.
(Continued)

(51) Int. Cl.
| | |
|---|---|
| *G01G 17/00* | (2006.01) |
| *G01G 11/00* | (2006.01) |
| *G01G 13/16* | (2006.01) |
| *G01G 3/00* | (2006.01) |
| *G01G 19/00* | (2006.01) |
| *B01D 21/26* | (2006.01) |
| *E21B 21/01* | (2006.01) |
| *E21B 21/06* | (2006.01) |

(52) U.S. Cl.
CPC ........... *G01G 17/00* (2013.01); *B01D 21/265* (2013.01); *B01D 21/267* (2013.01); *E21B 21/065* (2013.01); *G01G 3/00* (2013.01); *G01G 13/16* (2013.01); *G01G 19/00* (2013.01); *E21B 21/01* (2013.01); *G01G 11/003* (2013.01)

(58) Field of Classification Search
CPC ........ G01G 11/003; G01G 17/00; G01G 3/00; G01G 13/16; G01G 19/00; E21B 21/01; E21B 21/065; E21B 21/066; B01D 21/265; B01D 21/267
See application file for complete search history.

(56) References Cited

U.S. PATENT DOCUMENTS

| | | | |
|---|---|---|---|
| 3,516,551 | A | 6/1970 | Wallen et al. |
| 3,764,008 | A | 10/1973 | Darley |
| 4,187,088 | A | 2/1980 | Hodgson |

(Continued)

FOREIGN PATENT DOCUMENTS

| | | |
|---|---|---|
| EP | 1454028 | 3/2008 |
| WO | 20050944962 | 10/2005 |

OTHER PUBLICATIONS

Fred Mueller, Fundamentals of Gas Solids/Liquids Separation, 2004, www.muellerenvironmental.com.
(Continued)

*Primary Examiner* — Randy W Gibson
(74) *Attorney, Agent, or Firm* — McAughan Deaver PLLC

(57) ABSTRACT

A well production particulate measurement system having a stationary frame removably mountable to tank, a hopper coupled to the frame and moveable relative to the frame; a well production inlet configured to receive well production and discharge the particulates and liquid into the hopper, and to strip at least a portion of a gas phase from the well production; and a weight transducer coupled to the system and configured to sense a weight of particulates in the hopper.

20 Claims, 25 Drawing Sheets

Related U.S. Application Data

62/832,717, filed on Apr. 11, 2019, provisional application No. 62/812,046, filed on Feb. 28, 2019.

(56) References Cited

U.S. PATENT DOCUMENTS

| | | |
|---|---|---|
| 4,238,210 A | 12/1980 | Regehr |
| 4,519,848 A | 5/1985 | Underwood |
| 5,635,068 A | 6/1997 | Marandi |
| 5,961,700 A | 10/1999 | Oliver |
| 6,119,870 A | 9/2000 | Maciejewski |
| 6,410,862 B1* | 6/2002 | Lecann ............... E21B 21/065 |
| | | 73/152.43 |
| 7,147,788 B2 | 12/2006 | Tveten |
| 7,166,230 B2 | 1/2007 | Nilsen |
| 7,569,098 B2 | 8/2009 | Oglesby |
| 7,708,808 B1 | 5/2010 | Heumann |
| 7,785,400 B1 | 8/2010 | Worley |
| 8,252,179 B2 | 8/2012 | Aoki |
| 8,313,565 B2 | 11/2012 | Sarshar |
| 8,317,904 B2 | 11/2012 | Sarshar et al. |
| 9,089,792 B2 | 7/2015 | Zylla |
| 9,821,257 B2 | 11/2017 | Arefjord |
| 2003/0168391 A1 | 9/2003 | Tveiten |
| 2005/0224426 A1 | 10/2005 | Arefjord |
| 2008/0196942 A1* | 8/2008 | Bingham ............... E21B 49/005 |
| | | 175/46 |
| 2014/0283753 A1* | 9/2014 | Dawn ................ A01K 1/0114 |
| | | 119/166 |
| 2014/0352538 A1 | 12/2014 | Larnholm |
| 2016/0030861 A1 | 2/2016 | Janssen et al. |
| 2016/0375386 A1 | 12/2016 | Magnus et al. |
| 2018/0099871 A1 | 4/2018 | Tanner et al. |
| 2018/0353975 A1 | 12/2018 | Spiridonov et al. |

OTHER PUBLICATIONS

Enercorp Sand Solutions, Sand Hybrid: Screen + Cyclone, 2018, www.enercoprsandsolutions.com.

Weatherford, Alpha VSRD Multiphase Meter, 2016, www.weatherford.com.

* cited by examiner

WELL FLUID MANAGEMENT SYSTEMS AND METHODS

CROSS REFERENCE TO RELATED APPLICATIONS

This application is a non-provisional of U.S. Patent Application No. 62/832,717, filed on Apr. 11, 2019. This application also is a non-provisional of United States Patent Application No. 62/849,158 and Application No. 62/849,226, both filed on May 17, 2019. This application also is a continuing application of U.S. patent application Ser. No. 16/804,250, filed on Feb. 28, 2020, which is a non-provisional of U.S. Patent Application No. 62/812,046, filed on Feb. 28, 2019. The entire contents of each of the foregoing applications are incorporated herein by reference for all purposes.

STATEMENT REGARDING FEDERALLY SPONSORED RESEARCH OR DEVELOPMENT

Not applicable.

REFERENCE TO APPENDIX

Not applicable

BACKGROUND OF THE INVENTION

Field of the Invention. The inventions disclosed and taught herein generally relate to systems for separating and managing a multi-component flow into one or more of its components; and more specifically relate to separating and managing sand, particulates and fluids from subterranean well flow.

DESCRIPTION OF THE RELATED ART

Flow from a subterranean well is typically a combination of solids, water (typically brine), and liquid and gaseous hydrocarbons. The solids or particulates typically are parts of the formation from which the hydrocarbon is being produced, particulates introduced into the well by hydraulic fracturing, and/or produced by a phase change of hydrocarbons (asphalt or wax formation). Particulate flow from the well may cause problems through abrasion or plugging of production equipment. A stimulated well may produce sand for a month or more after production begins.

The industry has developed equipment intended to separate well flow or production into one or more of its constituent parts, including sand knock out equipment, desanders, and separating tanks. For example, U.S. Pat. No. 7,147,788 is entitled Separating a Hydrocarbon Production Stream into its Oil, Water and Particle Constituents and discusses "A separation method and apparatus are disclosed having particular application for effecting removal of sand from a production wellstream, enhancing the quality of recovered oil, gas and water output streams (12, 13, 14) and reducing erosion caused by entrained sand. The wellstream is passed initially through a cyclone separator (4') which separates substantially all the water and sand as underflow and substantially all the oil and gas as overflow. A gravity separator (11) separates the overflow from the cyclone separator (4') into oil, gas and water, and a further cyclone separator (17) separates the underflow from the first cyclone separator (4') into water and sand."

U.S. Pat. No. 9,821,257 is entitled Solid-Liquid Separator and discusses "A liquid cyclone is configured for inflowing raw water containing impurities as targets of collection to be forced to swirl inside to spin down impurities contained in raw water, an inflow pipe is connected with an upper portion of the liquid cyclone to supply the liquid cyclone with raw water, and configured for supplied raw water to be forced to swirl inside the liquid cyclone, a connecting portion is connected with a lower portion of the liquid cyclone, and configured with a discharge port to discharge spun down impurities from the liquid cyclone, an impurity collector is connected to the liquid cyclone with the connecting portion in between, and configured to collect impurities discharged from the liquid cyclone, an obstacle is disposed in or near the discharge port, and configured to prevent impurities collected in the impurity collector from backing up into the liquid cyclone, and an outflow pipe is connected with a top portion of the liquid cyclone, and configured for raw water having got rid of impurities to outflow as treated water from the liquid cyclone, whereby impurities separated from raw water is prevented from being re-mixed in raw water, allowing for an enhanced separation performance."

U.S. Pat. No. 9,821,257 is entitled Dynamic Particle Separator and discusses "A dynamic particle separator is described for cyclone separation of sand from a gas stream in connection with petroleum related production of oil and gas, where the separator comprises a housing (14) containing as cyclone tank (4) that is equipped with an upper inlet opening (1) for the gas stream and an upper and a lower outlet opening (2, 12) for export of gas and particles, respectively, from the tank (4). The cyclone tank (4) is formed, at least in an internal area around the inlet opening (1), with an upper and downwardly directed conical shape (4 a) that increases in diameter, and where the upper conical shape (4 a) thereafter has a transition into an inverse, lower conical shape (4 b) that converges towards the lower outlet opening (12)."

U.S. Patent Application Publication No. 2014/0352538 is entitled Spherical Separation Device and Method for Separation and discusses "The present invention relates to an apparatus for separation of high volume flows of mixtures provided with at least two immiscible phases, especially for the first separation steps of flows of water/oil/gas/sand mixture that enter the apparatus as a wellstream mixture. The invention also relates to a method for separation of high volume flows of mixtures provided with at least immiscible phases."

The inventions disclosed and taught herein are directed to improved well production separation and management systems and methods

BRIEF SUMMARY OF THE INVENTION

As a brief, non-limiting summary of many possible embodiments of the present inventions, a well production particulate measurement system, may comprise a stationary frame configured to removably mount to upper portion of a tank; a hopper coupled to the stationary frame so that the hopper can move relative to the stationary frame along at least a gravitational axis, the hopper configured to continually discharge a liquid component of the well production into the tank to which the stationary frame is removably coupled, and the hopper configured to receive and hold particulates in the well production and periodically discharge the particulates from the hopper; a well production inlet configured to receive the well production and discharge the particulates and liquid component into the hopper such that substantially all of the particulate and liquid is captured by the hopper; and a weight transducer coupled to the system and configured to determine a weight of particulates in the hopper at a predetermined time. The tank may be an open top frac tank. The hopper may further comprise a perforated base and screen system configured to pass liquid from the hopper and to retain particulates of a predetermined size. The system may drain the liquid into the tank. The system further may further comprise a flush system configured to provide a liquid for flushing particulates from the hopper. The liquid used by the flush system may be liquid pumped from the tank. The inlet comprises an inner pipe having a plurality of openings sized to pass particulates in the well fluid, the piper surrounded by an outer shell having a plurality of openings sized to pass particulates in the well fluid, and wherein the openings in the pipe and the openings in the shell are not aligned. The alignment of the openings may be substantially opposite. The weight transducer may be a mechanical scale. The weight transducer may be a load cell. The system may further comprise a visual display configured to receive information from the load cell and continuously display a weight of contents of the hopper. The system may further comprise a wireless transceiver configured to transmit and receive information from the load cell to a portable processing device configured to display a weight of contents of the hopper.

BRIEF DESCRIPTION OF THE SEVERAL VIEWS OF THE DRAWINGS

The following figures form part of the present specification and are included to demonstrate further certain aspects of the present inventions through certain non-limiting embodiments. The inventions may be better understood by reference to one or more of these figures in combination with the detailed description of specific embodiments presented herein.

Figure 1:
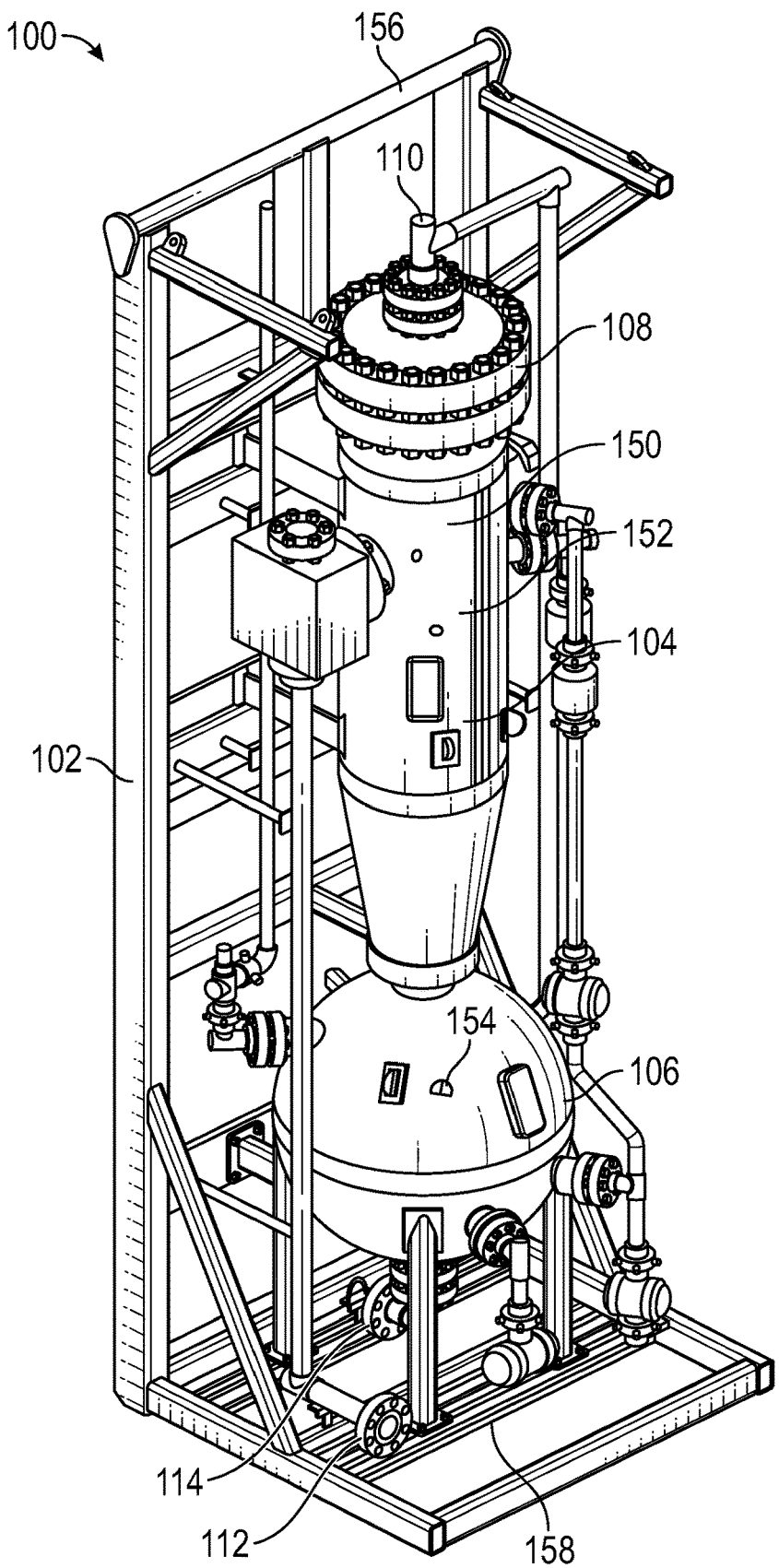
FIG. 1 illustrates a perspective view of one of many embodiments of a well production separation system according to the present inventions.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

The Figures described above, and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Aspects of the inventions disclosed herein may be embodied as an apparatus, system, method, or computer program product. Accordingly, specific embodiments may take the form of an entirely hardware embodiment, an entirely software embodiment or an embodiment combining software and hardware aspects, such as a "circuit," "module" or "system." Furthermore, embodiments of the present inventions may take the form of a computer program product embodied in one or more computer readable storage media having computer readable program code.

Items, components, functions, or structures in this disclosure may be described or labeled as a "module" or "modules." For example, but not limitation, a module may be configured as a hardware circuit comprising custom VLSI circuits or gate arrays, off-the-shelf semiconductors such as logic chips, transistors, or other discrete components. A module also may be implemented as programmable hardware devices such as field programmable gate arrays, programmable array logic, programmable logic devices, or the like. Modules also may be configured as software for execution by various types of processors. A module of executable code may comprise one or more physical or logical blocks of computer instructions that may be organized as an object, procedure, or function. The executables of a module need not be physically located together but may comprise disparate instructions stored in different locations that when joined logically together, comprise the module and achieve the stated purpose or function. A module of executable code may be a single instruction, or many instructions, and may even be distributed over several different code segments, among different programs, and across several memory devices. Similarly, data may be identified and illustrated herein within modules, and may be embodied in any suitable form and organized within any suitable type of data structure. The data may be collected as a single dataset or may be distributed over different locations including over different storage devices, and may exist, at least partially, merely as electronic signals on a system or network. Where a module or portions of a module are implemented in software, the software portions may be stored on one or more computer readable storage media.

When implementing one or more of the inventions disclosed herein, any combination of one or more computer readable storage media may be used. A computer readable storage medium may be, for example, but not limitation, an electronic, magnetic, optical, electromagnetic, infrared, or semiconductor system, apparatus, or device, or any suitable combination of the foregoing. More specific, but non-limiting, examples of the computer readable storage medium may include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this disclosure, a computer readable storage medium may be any tangible medium that can contain or store a program for use by or in connection with an instruction execution system, apparatus, or device.

Computer program code for carrying out operations of one or more of the present inventions may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. The remote computer may be connected to the user's computer through any type of network, including a local area network (LAN) or a wide area network (WAN), or the connection may be made to an exterior computer for example, through the Internet using an Internet Service Provider.

Reference throughout this disclosure to "one embodiment," "an embodiment," or similar language means that a particular feature, structure, or characteristic described in connection with the embodiment is included in at least one of the many possible embodiments of the present inventions. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of one embodiment may be combined in any suitable manner in one or more other embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. Those of skill in the art having the benefit of this disclosure will understand that the inventions may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood by those of skill in the art that each block of the schematic flowchart diagrams and/or schematic block diagrams, and combinations of blocks in the schematic flowchart diagrams and/or schematic block diagrams, may be implemented by computer program instructions. Such computer program instructions may be provided to a processor of a general purpose computer, special purpose computer, or other programmable data processing apparatus to create a machine or device, such that the instructions, which execute via the processor of the computer or other programmable data processing apparatus, structurally configured to implement the functions/acts specified in the schematic flowchart diagrams and/or schematic block diagrams block or blocks. These computer program instructions also may be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions also may be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and/or operation of possible apparatuses, systems, methods, and computer program products according to various embodiments of the present inventions. In this regard, each block in the schematic flowchart diagrams and/or schematic block diagrams may represent a module, segment, or portion of code, which comprises one or more executable instructions for implementing the specified logical function(s).

It also should be noted that, in some possible embodiments, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they do not limit the scope of the corresponding embodiments. Indeed, some arrows or other connectors may be used to indicate only the logical flow of the depicted embodiment. For example, but not limitation, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, may be implemented by special purpose hardware-based systems that perform the specified functions or acts, or combinations of special purpose hardware and computer instructions.

The description of elements in each Figure may refer to elements of proceeding Figures. Like numbers refer to like elements in all figures, including alternate embodiments of like elements. In some possible embodiments, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

Well Production Separation System. We have created a well production separation system that is configured and arranged to efficiently separate solids, such as sand and other particulates, from the liquid and gaseous constituents in the produced fluid. It will be understood that while a solid, such as sand, is not a "fluid," the terms "well fluid" and "produced fluid" are used herein to refer to all matter, regardless of state, that is produced from a well in the attempt to recover hydrocarbons. Embodiments of the well production separation system may comprise a first centrifugal or cyclonic separator configured to discharge particulates in the form of a slurry in a downward direction, and to discharge other liquids and/or gases in an upward direction. Preferably, the first separator is configured with an access port to install a replaceable cyclone module within the first separator. The cyclone module may comprise one cyclonic separator or a plurality of cyclonic separators, as desired based on the flow characteristics of the well and the contents of the well production. The cyclone module is preferably clocked, oriented such that when seated in the first separator, a module inlet aligns with an inlet in the first separator. An inlet sleeve, preferably having an abrasion or erosion resistant coating or surface may be used to communicate well production from an inlet manifold to the cyclone module.

The slurry discharge of the first separator may be coupled to a spherical separator having a swirl inducer at the inlet thereof. The swirl inducer may be configured to induce or promote a swirling or rotating component to the incoming particulate. The swirl inducer is preferably partly spherical in shape such that a collection area for liquids and gases is formed by an underside. A slurry outlet may be provided adjacent the bottom of the spherical separator to discharge the particulates separated from the well production from the system.

Embodiments of the well production separation system also may comprise a liquid/gas recycle circuit. For example, a recycle circuit may allow liquid and gases from the collection area in the spherical separator to flow into an area in the first separator above the cyclone module. The recycle circuit also may allow liquid and/or gases from an area in the first separator below the cyclone module to flow into the area in the first separator above the cyclone module. Suitable flow check valves and isolation valves may be incorporated into the recycle circuit as desired.

Embodiments of the well production separation system may be mounted to a frame assembly configured to allow the separation system to be transported to a well site in a horizontal orientation, and then rotated into a vertical orientation for operation.

Embodiments of the well production separation system also may be instrumented. For example, one or more pressure sensors may be installed to monitor the pressure in various locations in the system. For example, but not limitation, a first pressure transducer may be located in an upper chamber above the cyclone module, and/or a second pressure transducer may be located below the cyclone module, and/or a third pressure transducer may be located in the spherical separator. The outputs from any of these transducers may be passive or active. Passive in the sense that the transduced value is simply reported or displayed, and active in the sense that the output may be communicated, through wired or wireless links, to a logic controller or computer, and used to control or affect one or more operational aspects of the system. In normal operation, there should be a pressure differential across the cyclone module (i.e., above and below). Flow rate, such as mass flow rate, through the system establishes the pressure differential. This pressure differential may be used to adjust the flow rate into the system to the optimum conditions for the specific system. Further, the pressure differential or absolute pressure of any sensor may be used to control a recycle isolation valve and/or a lower recycle take off valve. Further, a load sensing device, such as a load cell or strain gage, may be operatively associated with the system, such as the spherical separator, and used to control a slurry discharge valve or other such device. Information from the installed sensors may be used to shut down flow into the system in emergency conditions.

Instrumented embodiments of the well production separation system also may comprise a wired or, preferably wireless, communication component that can communicate uni-directionally or bi-directionally with a computer, control system, web site, and/or software application. For example, not limitation, an instrumented system may comprise a cellular wireless communication component that is configured to communicate information, e.g., data and/or control instructions, to and from the system and Internet site. A software application loaded on a smart phone, tablet, or laptop, may access the site and information to monitor and/or control the system.

Embodiments of well production separation systems utilizing one or more aspects of the inventions disclosed and taught herein provide benefits and advantages over conventional separation systems in the form of increased particulate separation efficiency, increase separation of liquids and gases, such as hydrocarbons, from particulate slurry, ease of modification for changing well conditions through use of modular components, such as a replaceable cyclone module, and ease of transport and operation.

Turning now to a discussion of selected, non-limiting embodiments of our inventions to illustrate how to make and use the inventions, FIG. 1 illustrates a well production separation system 100 mounted within a frame 102. The system 100 comprises a first centrifugal separator 104 and a second spherical separator 106. The centrifugal separator 104 is disposed above or on top of the spherical separator 106. The centrifugal separator 104 has an access flange 108, preferably at its upper end, which provides both access to the inner components of the centrifugal separator 104 and provides a primary liquid vapor outlet 110. A well production inlet 112 is provided into the centrifugal separator 104. Spherical separator 106 comprises a particulate outlet 114, preferably adjacent the bottom of the separator 106.

Figure 2:
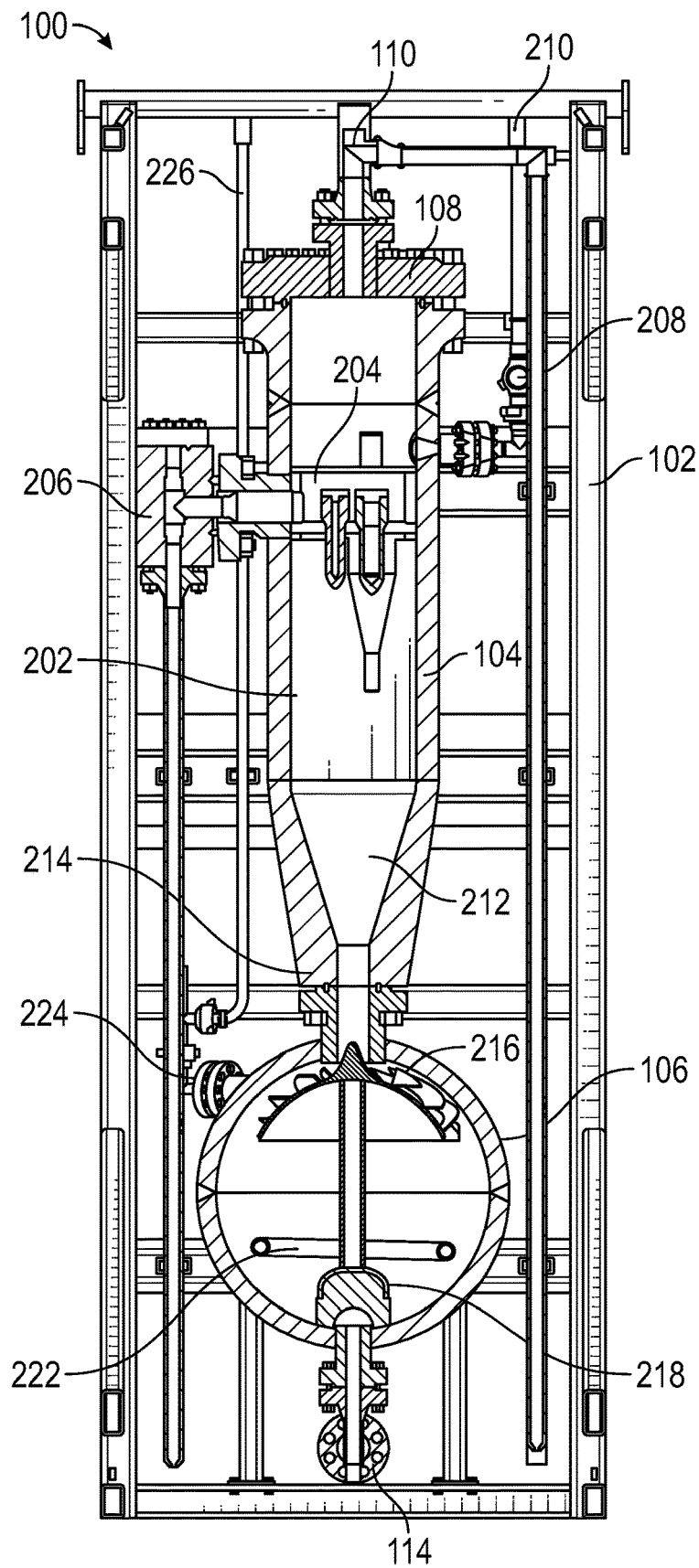
FIG. 2 illustrates a front view cross-section of the system of FIG. 1.

FIG. 2 illustrates a cross-sectional view of the separation system 100 illustrated in FIG. 1. The centrifugal separator 104 is shown to comprise a preferably cylindrical, or cylindrical and conical interior surface 202. An access flange 108 may seal to the top of the separator 104, and preferably comprises the primary liquid/vapor outlet 110. Disposed within the separator 104 is a cyclone module 204 comprising one or more cyclonic separators configured to separate at least particulate matter from liquids and gases. As will be discussed in more detail below, the cyclone module 204 is removably seated in the separator 104 and configured to communicate with an inlet manifold 206. Disposed between the cyclone module 204 and the top of the separator 104 is a pressure relief port that communicates to an upper pressure relief valve 208 and upper pressure relief stack 210.

Below the cyclone module 204, the separator 104 may comprise a conical section 212 in which the separated particulate matter, preferably in the form of a water-based slurry passess as it flows into the spherical separator 106. The spherical separator 106 comprises an inlet flange 214 coupled to the particulate outlet from separator 104. A swirl inducer 216 is disposed within the spherical separator 106, and preferably in a portion of the separator 106 immediately adjacent the inlet. It is preferred that the swirl inducer 216 comprise a partly domed or spherical shape, such as a truncated hemisphere, thereby defining a concave region opposite the inlet. At the bottom of the spherical separator 106, and preferably opposite the inlet, a slurry outlet 114 is provided. Inside the separator 106 and functionally associated with the slurry outlet 114 is a vortex breaker 218 configured to stop the formation of a vortex as the slurry is removed from the separator 106. Preventing formation of a vortex promotes any entrained liquids or gases, such hydrocarbons, to migrate upward and collect in the dome region of the swirl inducer 216. A liquid/vapor conduit 220 may be provided to remove liquids and gases that collect under the swirl inducer 216. The conduit 220 also may provide structural support for the swirl inducer without interfering with the slurry flow within the separator 106. A flush ring 222 also may be provided with the separator 106 and may be configured with multiple outlets generally directed to the slurry outlet 114 to aid in flushing or cleaning the separator 106. The system 100 may comprise a lower pressure relief valve 224 that communicates between a lower pressure relief stack 226 and the separator 106.

It will be appreciated that in operation, the pressure within the area above the cyclone module 204 will be less than the incoming fluid pressure and less than the pressure below the cyclone module 204. This pressure difference may be used to recycle entrained liquids and vapors, such as hydrocarbons, that are discharged from the cyclone module 204 with the particulate slurry.

Figure 3:
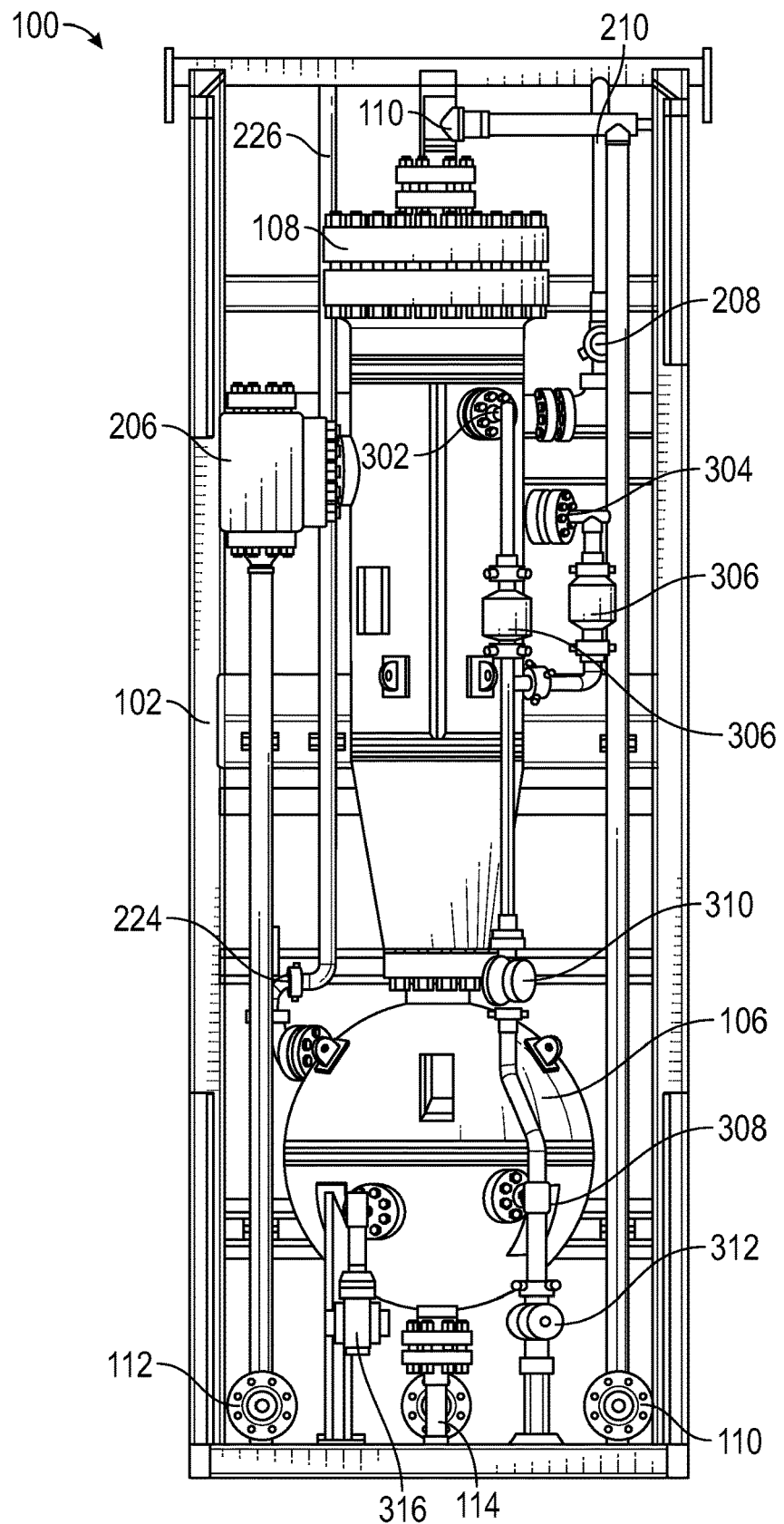
FIG. 3 illustrates a front view of the system illustrated in FIG. 1.
Figure 4:
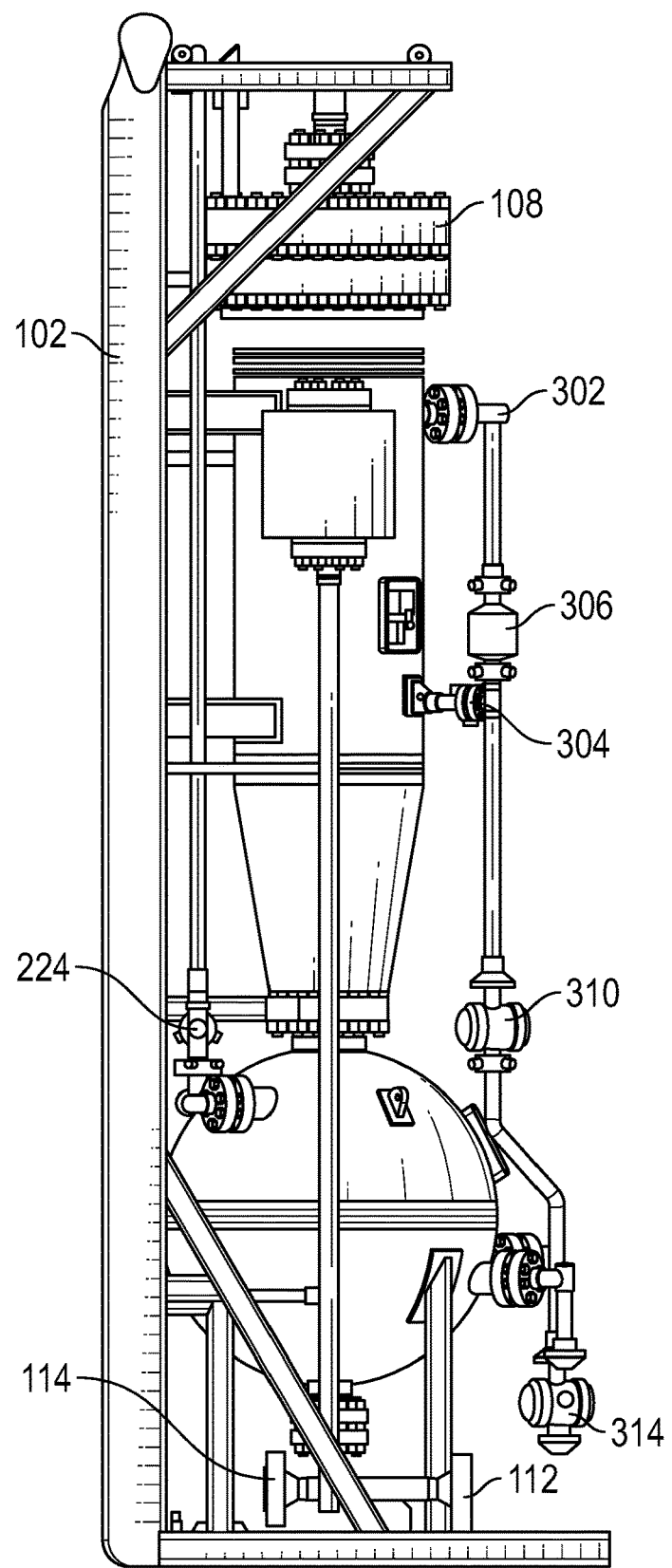
FIG. 4 illustrates a left side view of the system illustrated in FIG. 1.
Figure 5:
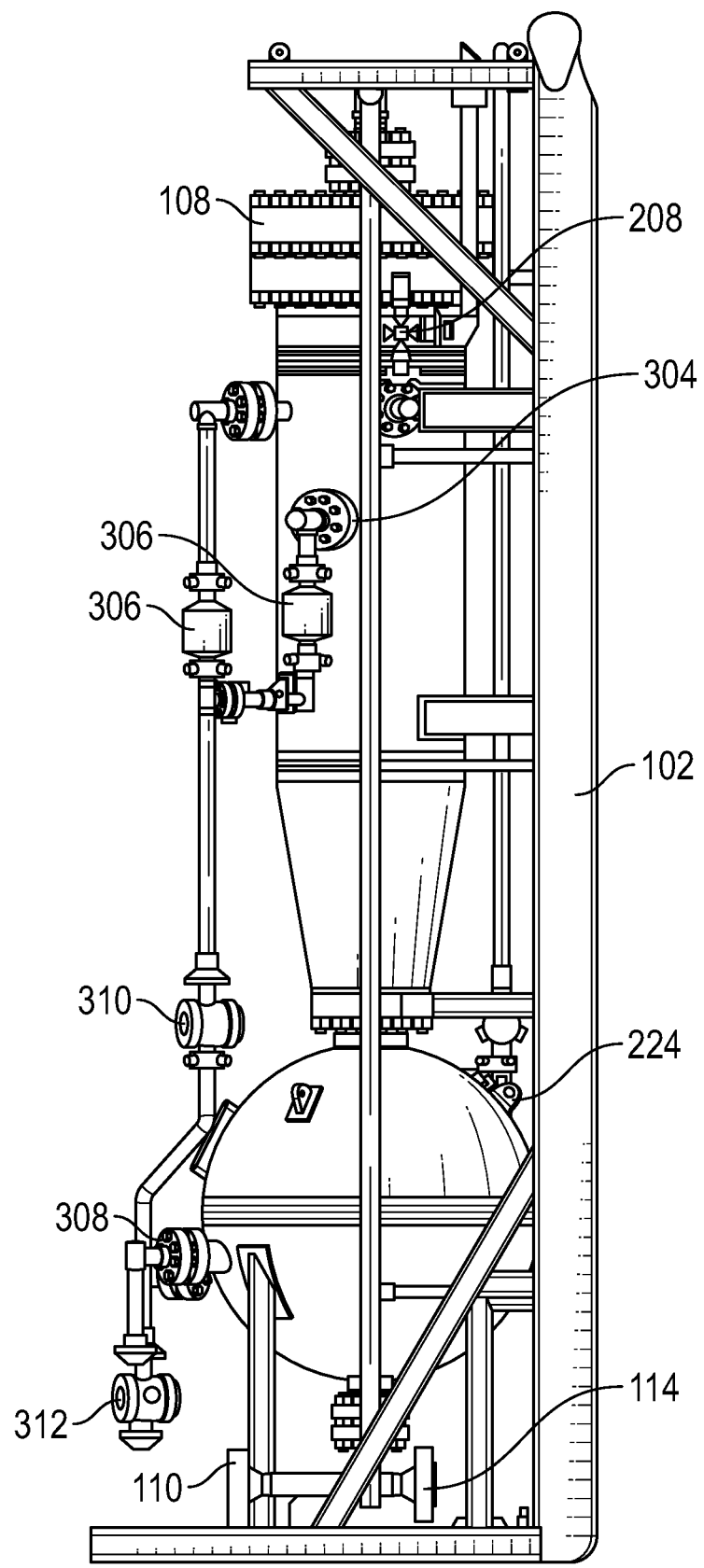
FIG. 5 illustrates a right side view of the system illustrated in FIG. 1.

FIGS. 3, 4, and 5, which are a front view, a right-side view, and a left side view, respectively, of the system 100, show a recycle inlet 302 that communicates with the interior region above the cyclone module 204. Also shown is an intermediate recycle outlet 304 that communicates with the interior region of separator 104 immediately below cyclone module 204. In a first embodiment, the intermediate recycle outlet 304 may be plumbed to the recycle inlet 302, including one or flow direction or check valves 306, so that liquids and/or vapors that collect below the cyclone module 204 can be recycled to the upper region of separator 104 for discharge through outlet 110. In another embodiment, the spherical separator 106 comprises a lower recycle outlet 308 that communicates with the collection region under the swirl inducer 216, preferably through conduit 220. The lower recycle outlet may be plumbed to the recycle inlet 302 so that liquids and/or vapors that collect in the spherical separator 106 may be recycled to the upper region of separator 104 for discharge through outlet 110. It is preferred that lower recycle outlet 308 comprise an isolation valve 310 to selectively block off the lower outlet 308 from the recycle inlet 302. In such embodiments, it is preferred to provide a lower recycle take off valve 312 so that liquids and/or vapors that collect in the spherical separator 106 may be extracted as desired. Also shown is an inlet flush valve 314 plumbed to communicate with the flush ring 222 shown in FIG. 2. It will be appreciated that a fluid, such as brine may be pumped through valve 314 to flush particulate slurry out through the outlet 114.

Figure 6:
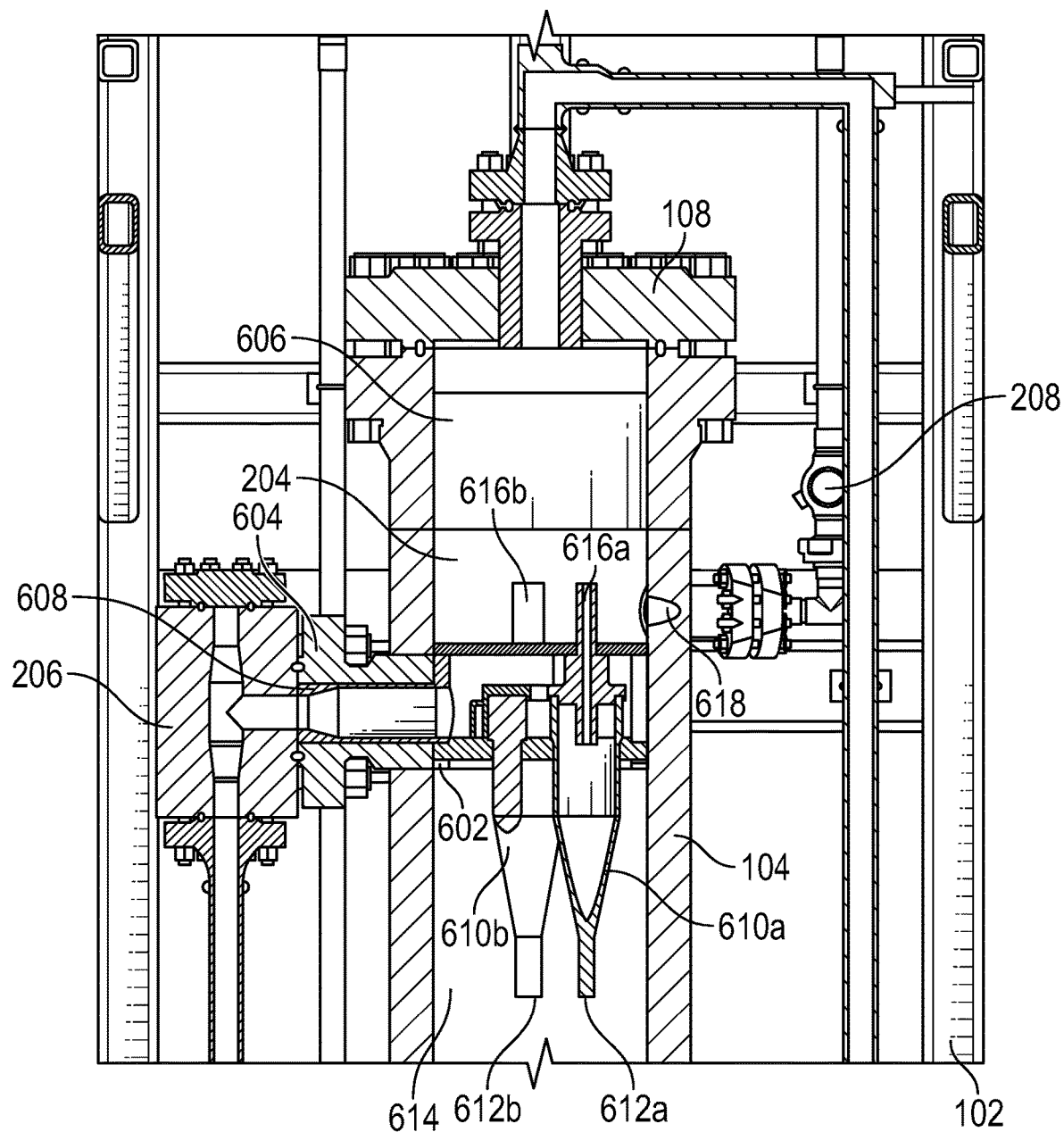
FIG. 6 illustrates a front cross section view of the centrifugal separator illustrated in FIG. 2.

Turning now to FIG. 6, which shows a close-up cross-sectional view of the cyclone module 204 seated in the first separator 104. As discussed, the interior of separator 104 preferably comprises a seat or seats 602 configured to support and orient the cyclone module 204 with respect to the inlet flange 604. It is preferred, but not required, that the module 204 and seat 602 form a seal that prevents migration of particles or fluids across the module 204 and into the upper chamber 606. It is preferred that the module 204 is removably secured into position within the separator 104, such by bolts or other threaded fasteners. The inlet flange 604 preferable comprises a replaceable inlet sleeve 608 configured to extend into and seal with an inlet port on the cyclone module 204. Because of the abrasive nature of the well production entering the system 100, the inlet sleeve 608 and/or cyclone module may be fabricated from abrasion/ erosion resistant materials or may have abrasion/erosion resistant coatings. Indeed, all components of a separation subject to abrasion or erosion may be fabricated from abrasion/erosion resistant materials or may have abrasion/erosion resistant coatings. In addition, shown communicating with the upper chamber is upper pressure relief valve 208 through upper pressure port 618.

Figure 7:
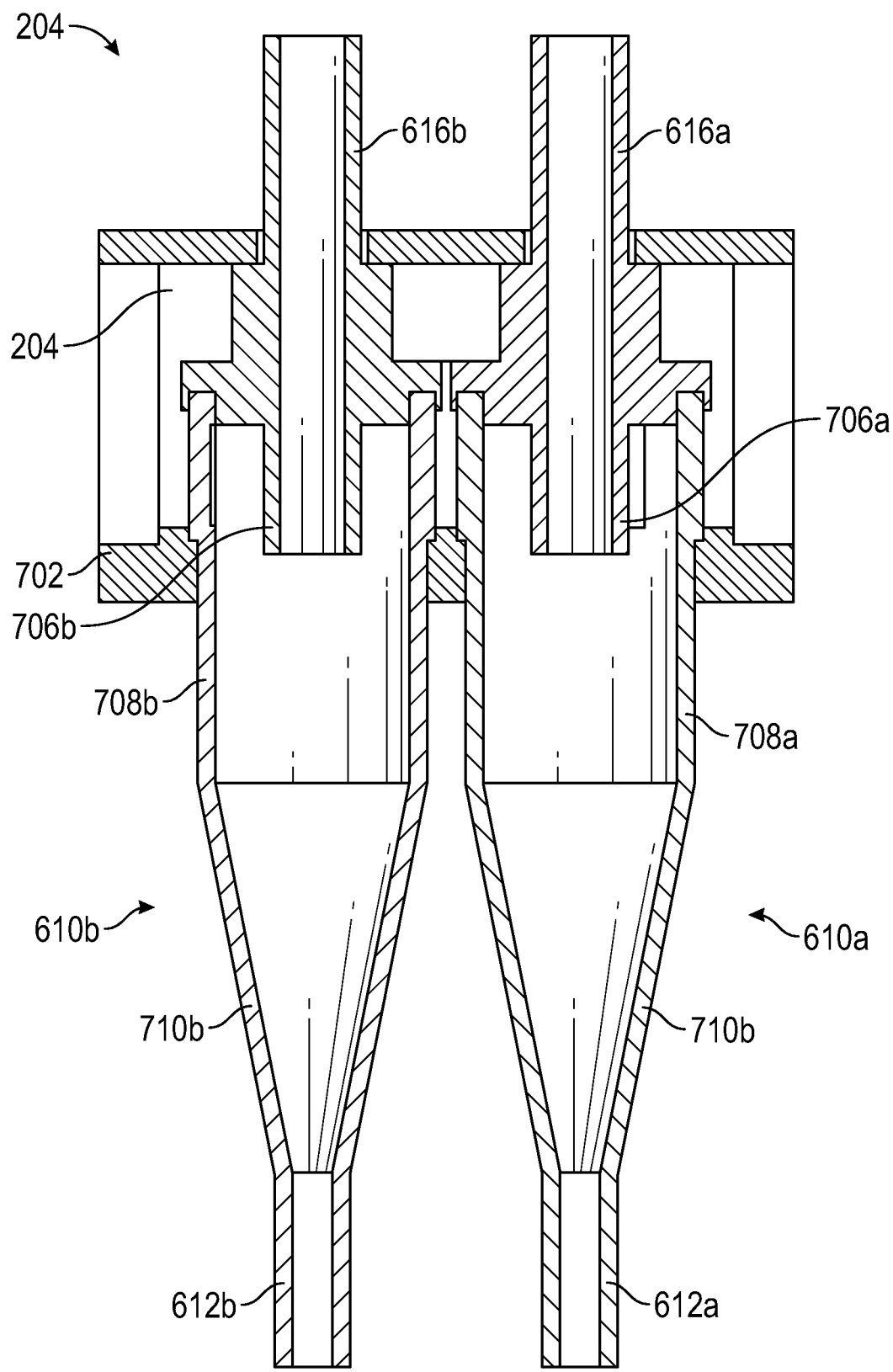
FIG. 7 illustrates a cross-sectional view of an embodiment of a cyclone module suitable for use with the present inventions.

With reference to FIGS. 6 and 7, cyclone module 204 is illustrated to comprise a modular body 702 housing two cyclonic separators 610a and 610b each having a particulate or slurry discharge outlet, or underflow, 612a and 612b communicating with an intermediate chamber 614 below the cyclone module 204. Each cyclonic separator 610a and 610b has a vortex outlet, or overflow, 616a and 616b communicating with the upper chamber 606. The modular body 702 comprises and inlet (not shown) communicating to a plenum 704 defined by the body 702. Each cyclonic separator 610a, 610b has an inlet that communicates with the plenum 704. In other words, well production entering the modular body 702 enters the plenum 704 and then enters each inlet of each cyclonic separator 610a, 610b.

As is known, a high-speed rotating flow is established within the cyclonic separator 610a, 610b. Fluid enters the cyclonic separator adjacent the vortex finder 706a, 706b, and flows in a helical pattern, beginning at the top of the cylindrical section 708a, 708b and ending at the bottom end of the conical section 710a, 710b before exiting the cyclone in a straight stream through the discharge tube 612a, 612b, and out the vortex outlet 616a, 616b. Heavier (denser) particles in the rotating flow have more inertia than lighter particles or components and contact the inside walls of the cylindrical and/or conical sections and fall to the bottom of the cyclonic separator and out the discharge tube. Because the rotational radius of the flow decreases in the conical section, smaller and smaller particles are separated from the flow. Lighter weight particles and components (such as liquids and gases) create the inner vortex that rises through the vortex finder 706a, 706b and out the outlet 616a, 616b. As is known, the cyclone geometry (e.g., size of discharge tube and vortex finder), together with volumetric flow rate, affect the particle separation size.

Referring to back to FIG. 1 and FIG. 6, FIG. 1 illustrates a pressure transducer or sensor 150 located and configured to sense or transduce pressure in the upper chamber 606. Additionally, or alternately, a second pressure transducer or sensor 152 may be located and configured to sense or transduce pressure in the intermediate chamber 614. Additionally, or alternately, a third pressure transducer or sensor 154 may be located and configured to sense or transduce pressure in the spherical separator 106. As discussed above, the output of one or all of these sensors may be displayed passively at the well fluid separator or may be displayed remotely on an Internet site and/or smart device. FIG. 1 also illustrates a logic controller or computer 156 located on the frame 102 and configured to communicate through wired or wireless connection, either uni-directionally or bi-directionally, with one or more of the sensors 150, 152, and/or 154. The controller/computer 156 may be configured, such as through logic circuits and/or software, to receive data from the sensors 150, 152 and/or 154, process the data, and report to a local display and/or an Internet site one or more operating conditions of the system 100. Alternately, the controller/computer 156, may be configured, such as through logic circuits and/or software, to control the state of one or more valves, such as, but not limited to, isolation valve 310. Additionally, controller/computer 156, may be configured, such as through logic circuits and/or software, to adjust the flow rate, such as mass flow rate, of the produced fluid at inlet 206 to maximize the separating efficiency of the cyclone module 204. Additionally, controller/computer 156, may be configured, such as through logic circuits and/or software, to receive commands from an Internet site, such as a website, and/or from a wireless smart device to adjust or control operational aspects of the system. For example and not limitation, a command or set of commands may be received by the controller/computer 156, to, for example, adjust the flow rate, such as mass flow rate, of the produced fluid at inlet 206, or to adjust the state of isolation valve 310. The frame 102 also may comprise a load cell or other weight transducing device 159 configured along to determine a weight or other amount of slurry in the spherical separator 106, and to adjust operation of the system 100 accordingly, such as by injecting water or brine to the flush ring 222 through valve 314.

Figure 8:
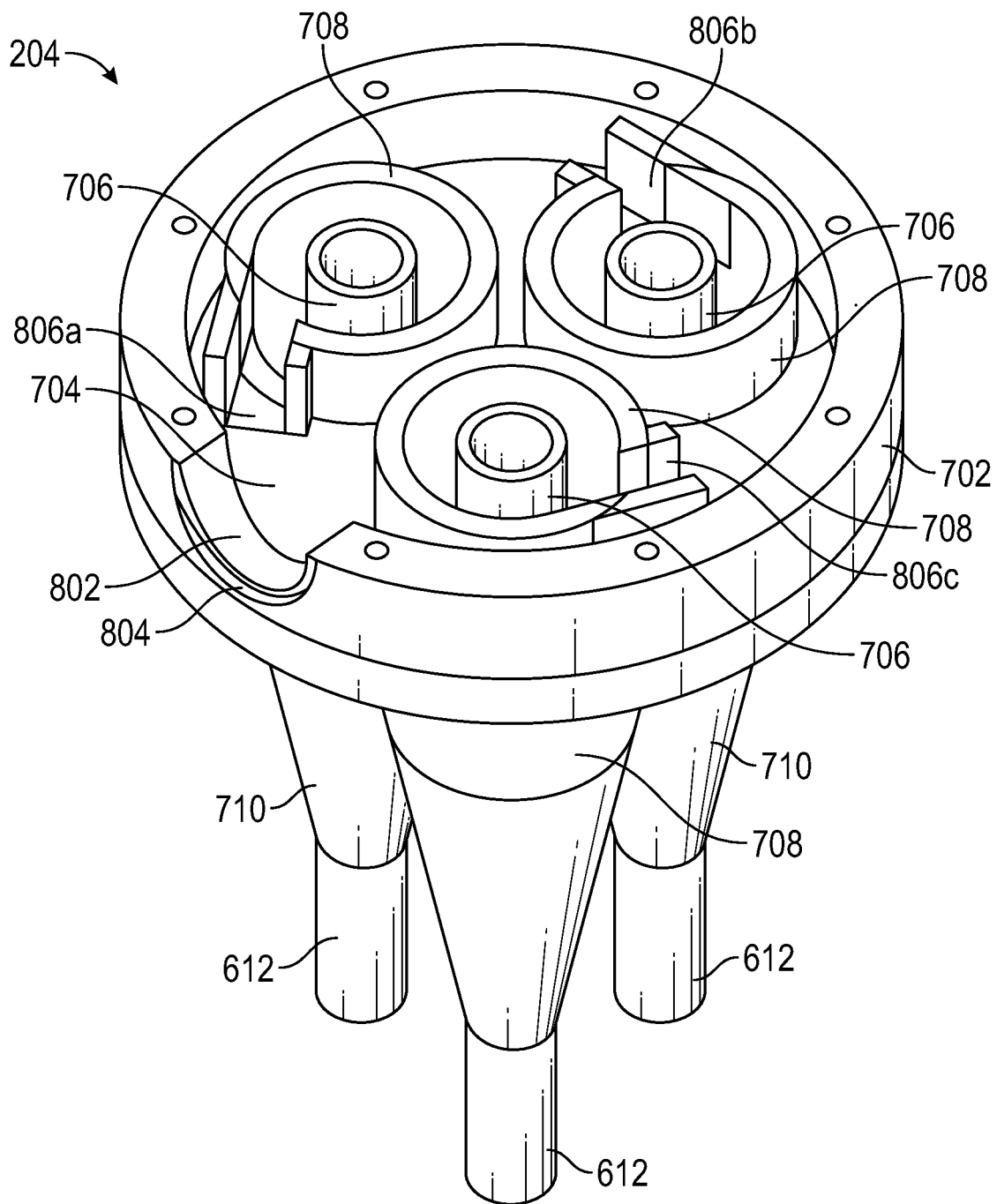
FIG. 8 illustrates another embodiment of a cyclone module suitable for use with the present inventions.
Figure 9:
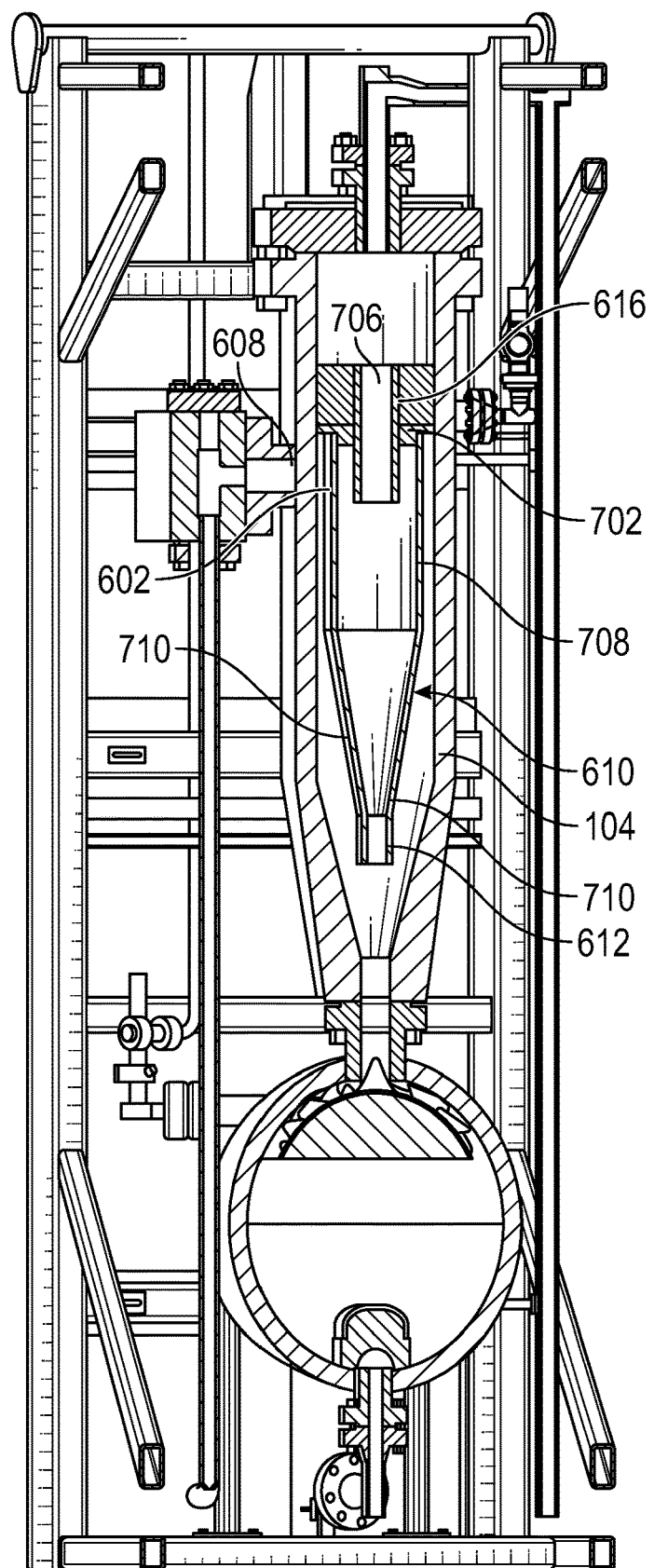
FIG. 9 illustrates another cyclone module suitable for use with the present inventions.

FIG. 8 illustrates another possible embodiment of a cyclone module 204 comprising three cyclonic separators. The top portion of the module body 702 has been removed for illustration purposes. As shown, the body 702 comprises a primary inlet 802 having a sealing surface 804. The inlet 802 communicates with the plenum 704. Each cyclonic separator comprises an inlet 806a, 806b, and 806c. The inlet is positioned on a tangent to the cylindrical section 708 of the cyclonic separator, adjacent the vortex finder 706. FIG. 9 illustrates yet another embodiment of a cyclone module 204 comprising a single cyclonic separator 610.

Figure 10A:
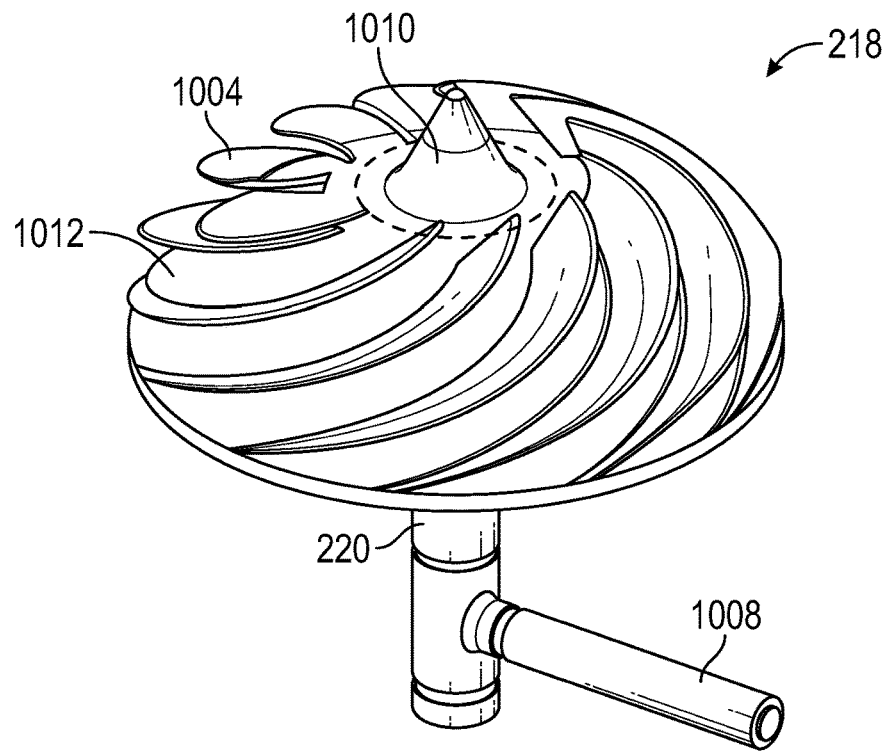
FIGS. 10A and 10B illustrate a swirl inducer suitable for use with the present inventions.
Figure 10B:
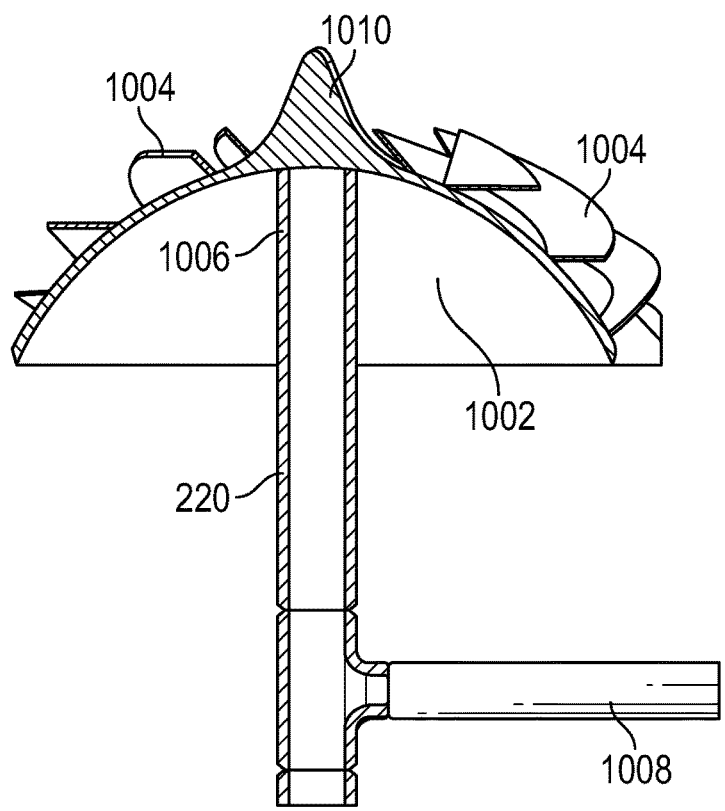

FIGS. 10A and 10B illustrate a swirl inducer 216 suitable for use with embodiments of the present inventions. The inducer 216 preferably comprises a partly spherical shape, such as a truncated hemisphere, thereby defining a collection zone 1002 under the spherical dome. Liquid/vapor conduit 220 may be secured to the underside of the dome, such as by threads or welding, and provide structural support to the inducer 216, such as react forces caused by the impending flow on swirl vanes 1004. Any upper portion of the conduit 220 is perforated to create an inlet 1006 for all liquids and gases that collect in the zone 1002 to enter the conduit 220. The perforations may comprise holes, a strainer, or other such integral or separate device. As shown in FIG. 2, if the conduit 220 is also the support structure for the swirl inducer 216, then a separate outlet pipe 1008 may be used to communicate from the collection zone to a lower recycle outlet 308 (FIG. 3). The swirl inducer 216 also preferably comprises a distribution cone 1010 configured to function with inlet flange 214 (FIG. 2) to evenly distribute material entering the spherical separator 106 about the swirl inducer, and to prevent material build up or blockage.

As shown in FIG. 2, the swirl inducer 216 (and distribution cone 1010) are preferably placed immediately adjacent the inlet to the spherical separator 106, yet spaced apart from the interior walls, forming an annular flow area. It will be appreciated that the size of this flow area preferably should not create a flow restriction (e.g., backpressure) that adversely affects the operation of the cyclone module 204. At the same time, the annular area should not be so large that the swirl vanes 1004 do not adequately impart rotation to the incoming material (e.g., slurry). It is believed that spacing the main surface 1012 of the swirl inducer off the interior surface of the spherical separator 106 by a distance between about 0.5 and 1.5 times the diameter of the inlet in inlet flange 214 provides satisfactory results.

Figure 11:
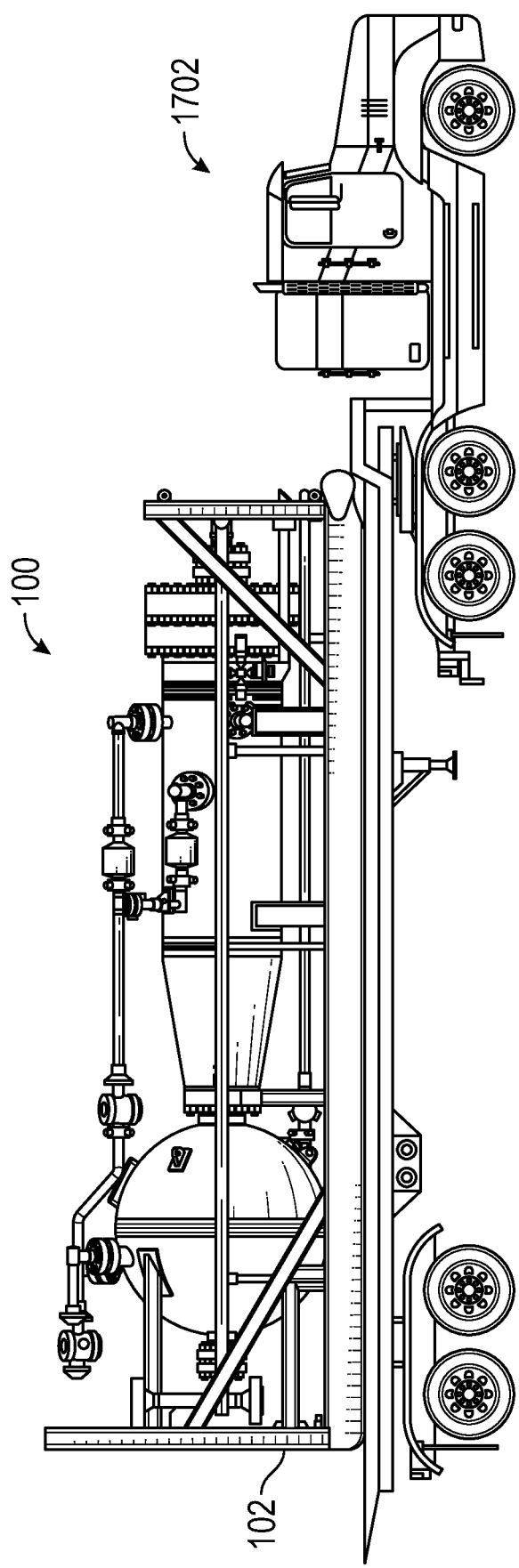
FIG. 11 illustrates the transportability of the present inventions.

FIG. 11 illustrates that well production separation systems practicing one or more of the inventions disclosed herein may be transported horizontally on a trailer to a well site, and then tilted into vertical operation position, such as by hydraulic arms or winching. Loading on the trailer may be accomplished in the same way to allow refurbishing of the system or replacement of parts, such as cyclone module 204.

Figure 12:
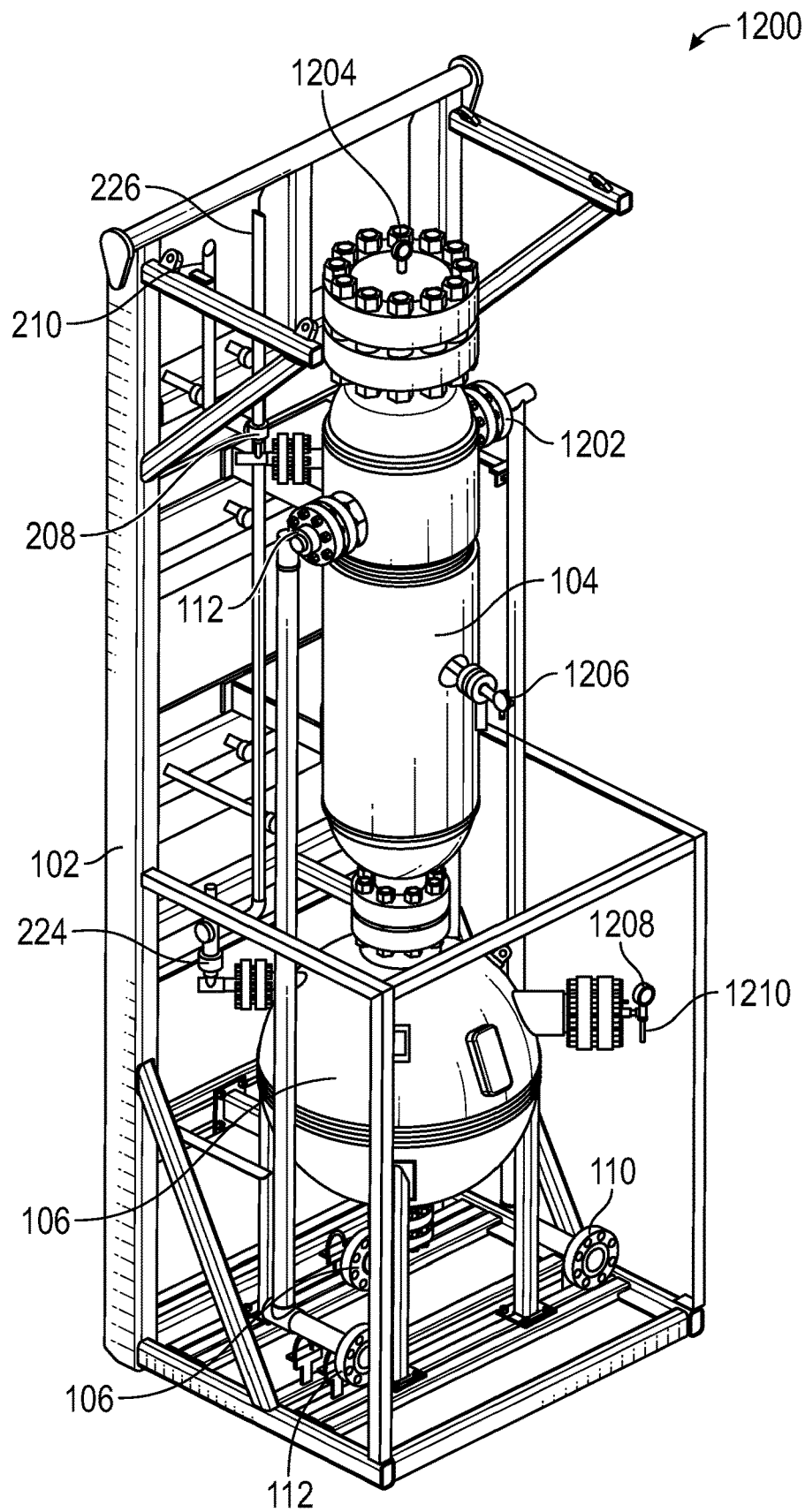
FIG. 12 illustrates a perspective view of another of the many embodiments of a well production separation system according to the present inventions.

FIG. 12 illustrates another embodiment of a well production separation system 1200 mounted on a frame 102, which system 1200 is similar, but not identical, to system 100 discussed previously. The system 1200 comprises a first centrifugal separator 104 and a second spherical separator 106. The centrifugal separator 104 is disposed above or on top of the spherical separator 106. The centrifugal separator 104 has an access flange 1203, preferably at its upper end, which has a lifting eye 1204 and which provides access to the inner components of the centrifugal separator 104. A well production inlet 112 is provided into the centrifugal separator 104, preferably adjacent the ground. Spherical separator 106 comprises a particulate outlet 114, preferably adjacent the bottom of the separator 106.

System 1200 comprises a liquid/vapor outlet 1202 located below the flange 1203 and communicating into the body of the centrifugal separator 104. The centrifugal separator 104 may have a pressure tap 1205 communicating the with the interior of the separator 104 below the cyclone (refer to FIG. 13) and configured to support a manual (e.g., dial) pressure gage or an electrical or electronic pressure transducer (not shown). Similarly, the spherical separator 106 may have a pressure tap 1209 configured to communicate the with the interior of the separator 106 and to support a manual (e.g., dial) pressure gage or an electrical or electronic pressure transducer (not shown). The pressure tap 1209 also may be configured to support a pressure equalization line 1210 that communicates from the interior of the spherical separator 106 to the liquid vapor outlet line 110.

Figure 13:
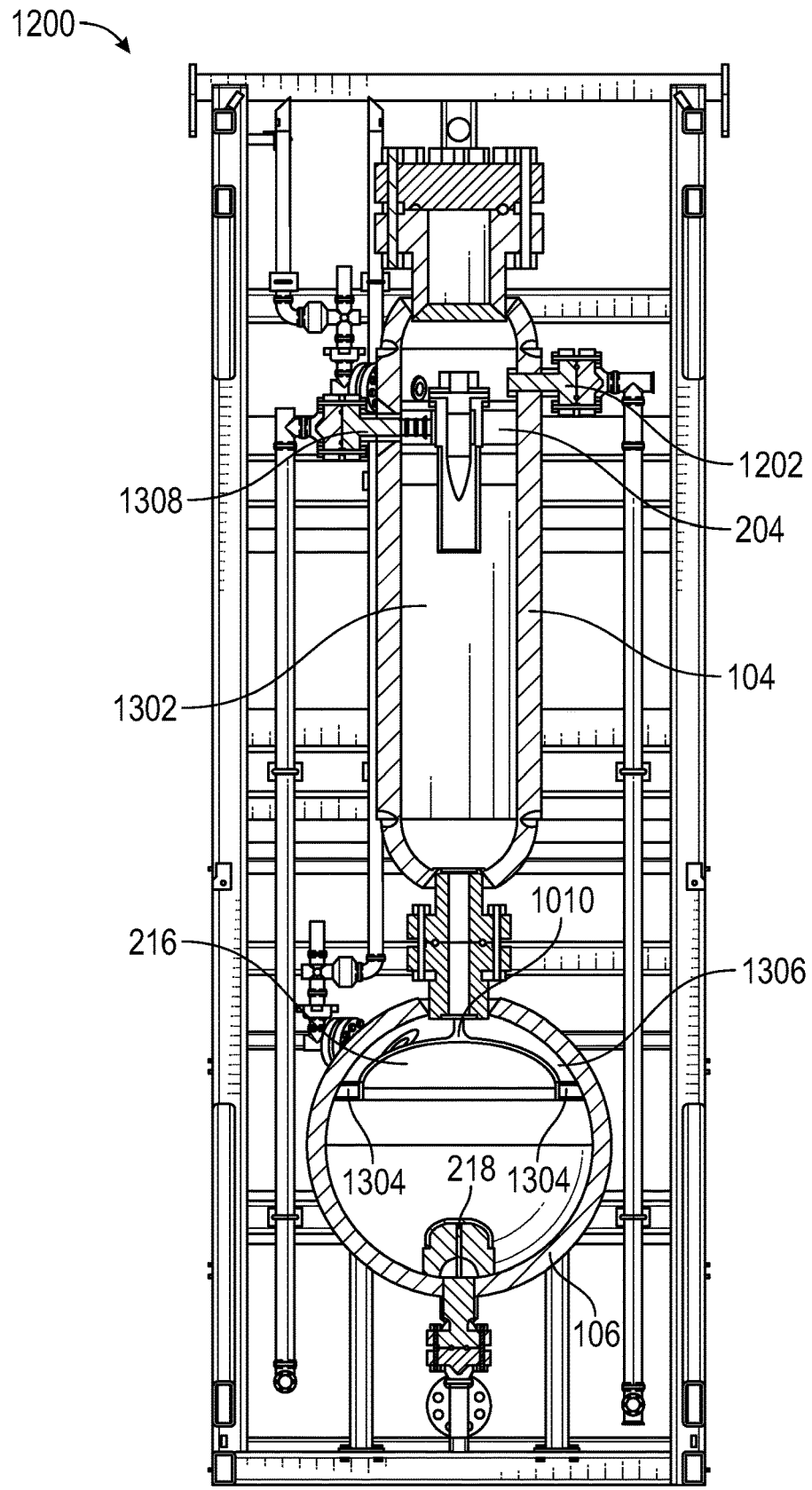
FIG. 13 illustrates a front view cross-section of the system of FIG. 12.

FIG. 13 illustrates a cross-sectional view of the separation system 1200 illustrated in FIG. 12. Disposed within the separator 104 is a cyclone module 204 comprising one or more cyclonic separators configured to separate at least particulate matter from liquids and gases. As discussed above, the cyclone module 204 may be removably seated in the separator 104 and configured to communicate with an inlet 1308. Disposed between the cyclone module 204 and the top of the separator 104 is a pressure relief port 1310 that communicates to an upper pressure relief valve 208 and upper pressure relief stack 210.

Below the cyclone module 204, the separator 104 may comprise a region in which the particulate matter separated by the cyclone module, preferably in the form of a water-based slurry, passes as it flows into the spherical separator 106. The spherical separator 106 comprises an inlet flange 214 coupled to the particulate outlet from separator 104. A swirl inducer 216 may be disposed within the spherical separator 106, and preferably in a portion of the separator 106 immediately adjacent and below the inlet. It is preferred that the swirl inducer 216 comprise a partly spherical or otherwise rounded shape, such as, but not limited to, a dome, thereby defining a region under the dome. At the bottom of the spherical separator 106, and preferably opposite the inlet, a slurry outlet 114 is provided. Inside the separator 106 and functionally associated with the slurry outlet 114 is a vortex breaker 218 configured to stop the formation of a vortex as the slurry is removed from or flows out of the separator 106. Preventing formation of a vortex promotes migration of any entrained liquids or gases, such as hydrocarbons, upward and to collect in the dome region of the swirl inducer 216. Although not shown in FIG. 13, a liquid/vapor conduit may be provided to remove liquids and gases that collect under the swirl inducer 216. The conduit also may provide structural support for the swirl inducer without interfering with the slurry flow within the separator 106. Alternately, and as shown in FIG. 13, swirl inducing vanes or blades (discussed below) also may provide structural support for the swirl inducer 216. The system 1200 also may comprise a lower pressure relief valve 224 that communicates between a lower pressure relief stack 226 and the separator 106.

Figure 14:
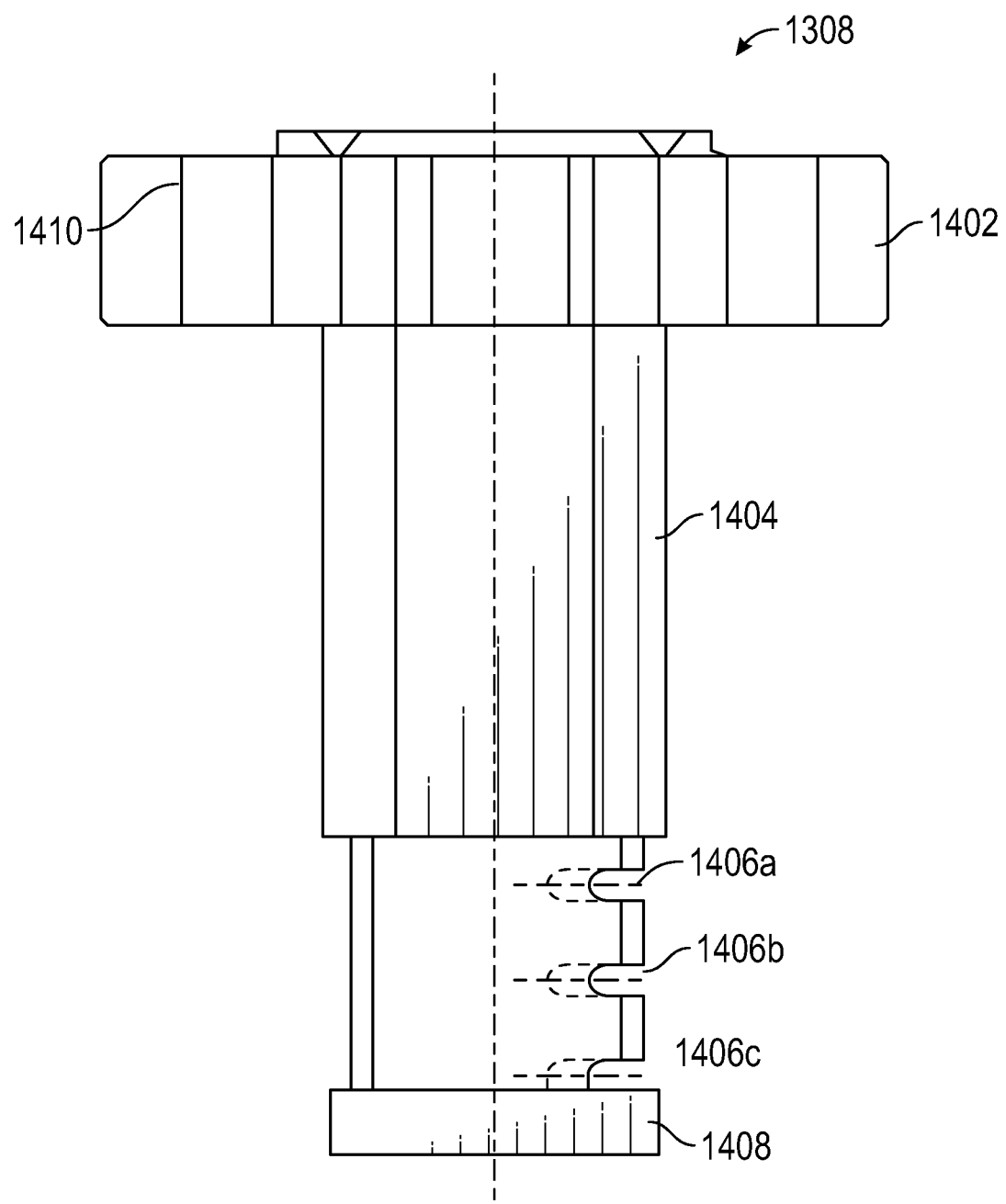
FIG. 14 illustrates a cross-sectional view of a replaceable fluid inlet useful with embodiments utilizing the present inventions.

FIG. 14 illustrates a form of centrifugal separator inlet flange 1308 that may be used with the embodiments previously discussed and with other separation system embodiments. Inlet flange 1308 comprises an axial flow channel that terminates in a blocking plate 1408. Fluid exits the inlet flange through a plurality of ports 1406a, 1406b, 1406c formed in the body 1404 of the inlet flange 1308. The ports 1406 preferably are sized based on the expected particulate size of the fluid and/or based on the flow openings in the cyclone module. More specifically, the ports 1406 can be sized to pass particulates having a size that will not block, occlude, or otherwise foul the cyclone module. If particulates larger than the ports 1406 become lodged or caught in the axial flow channel of the inlet flange (because the particulates cannot pass through the ports 1406), a pressure drop in the separation system will result, indicating the need to remove the trapped particulates. It is preferred that the inlet flange 1308 be readily removable from the separation system for cleaning, maintenance, or replacement. While the ports 1406 illustrated in FIG. 14 are oriented normal (e.g., radially) to the axial flow channel, it will be appreciated that the ports also may be located in plate 1408 or elsewhere on body 1404.

Figure 15:
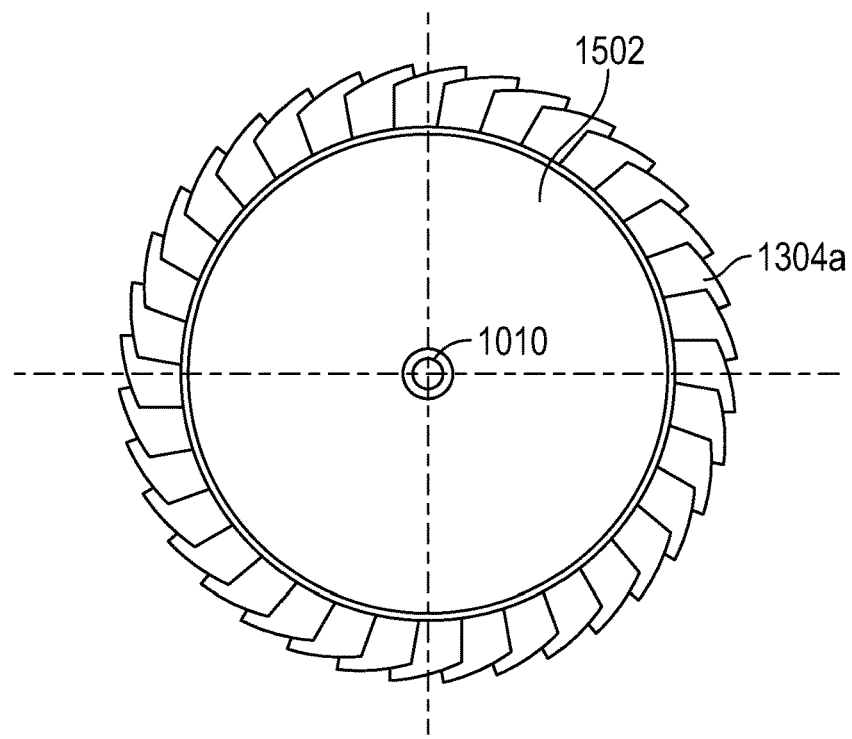
FIG. 15 illustrates a top side view of a swirl inducer useful with embodiments utilizing the present inventions.
Figure 16A:
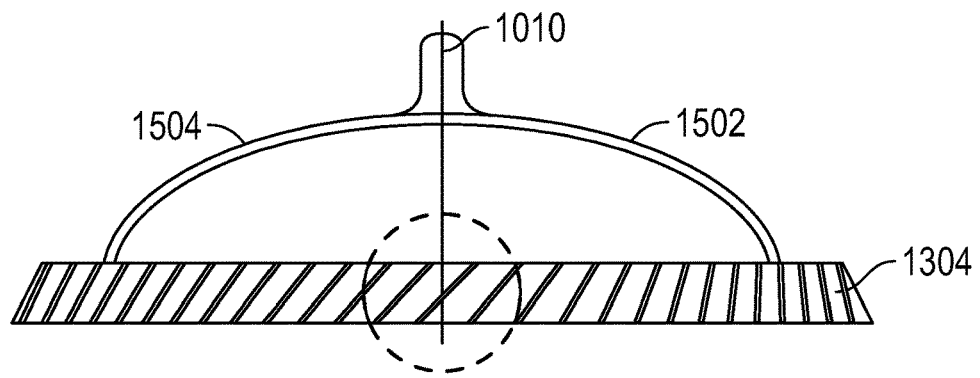
FIGS. 16A and 16B illustrate details of the swirl inducer shown in FIG. 15.
Figure 16B:
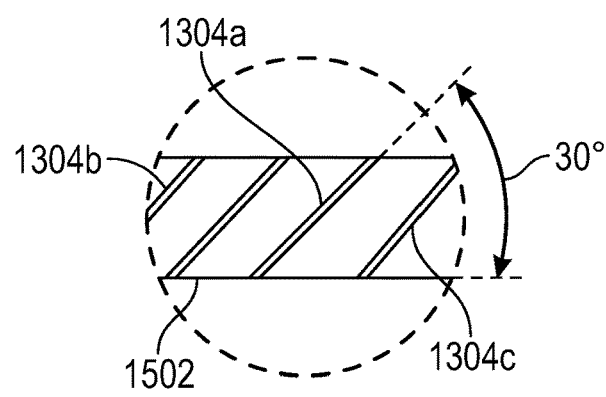

FIGS. 15, 16A and 16B illustrate an alternate form of a swirl inducer 216 useful with any of the embodiments discussed above. As shown in FIG. 15 fins or vanes 1304 may be disposed on a periphery of the body of the swirl inducer. As illustrated in FIG. 13, these vanes 1304 may provide structural support and placement of the swirl inducer within the spherical separator 106. For example, vanes 1304 may be welded to the inducer body and to the inner surface of the spherical separator 106. As illustrated in FIGS. 16A and 16B, the vanes 1304 may be oriented at an angle to the inlet centerline 1602, such as 60°, and preferably between 40° and 80° to the axial inlet axis (50° to 10° to a plane normal to the inlet flow axis). It will be appreciated that as the particulate slurry exits the centrifugal separator 104 and enters the spherical separator 106, and is distributed by the inlet cone 1010, flows along the outer surface 1502 in the annular region 1306 between the inducer 216 and the spherical separator interior wall. As discussed above, the annular region is sized to be large enough not to create backpressure that diminishes the performance of the cyclone module, and yet small enough to maximize the dissipation of flow energy by converting axial flow into circumferential flow. As discussed above, reducing the kinetic energy of the flowing slurry promotes dis-entrainment of particles, such as sand, from the slurry. Although FIG. 16A illustrates that the vanes 1304 have a height that is a fraction of the height of the inducer, the vane height may also be ⅓, ½ or even ⅔ of the inducer height.

Figure 17:
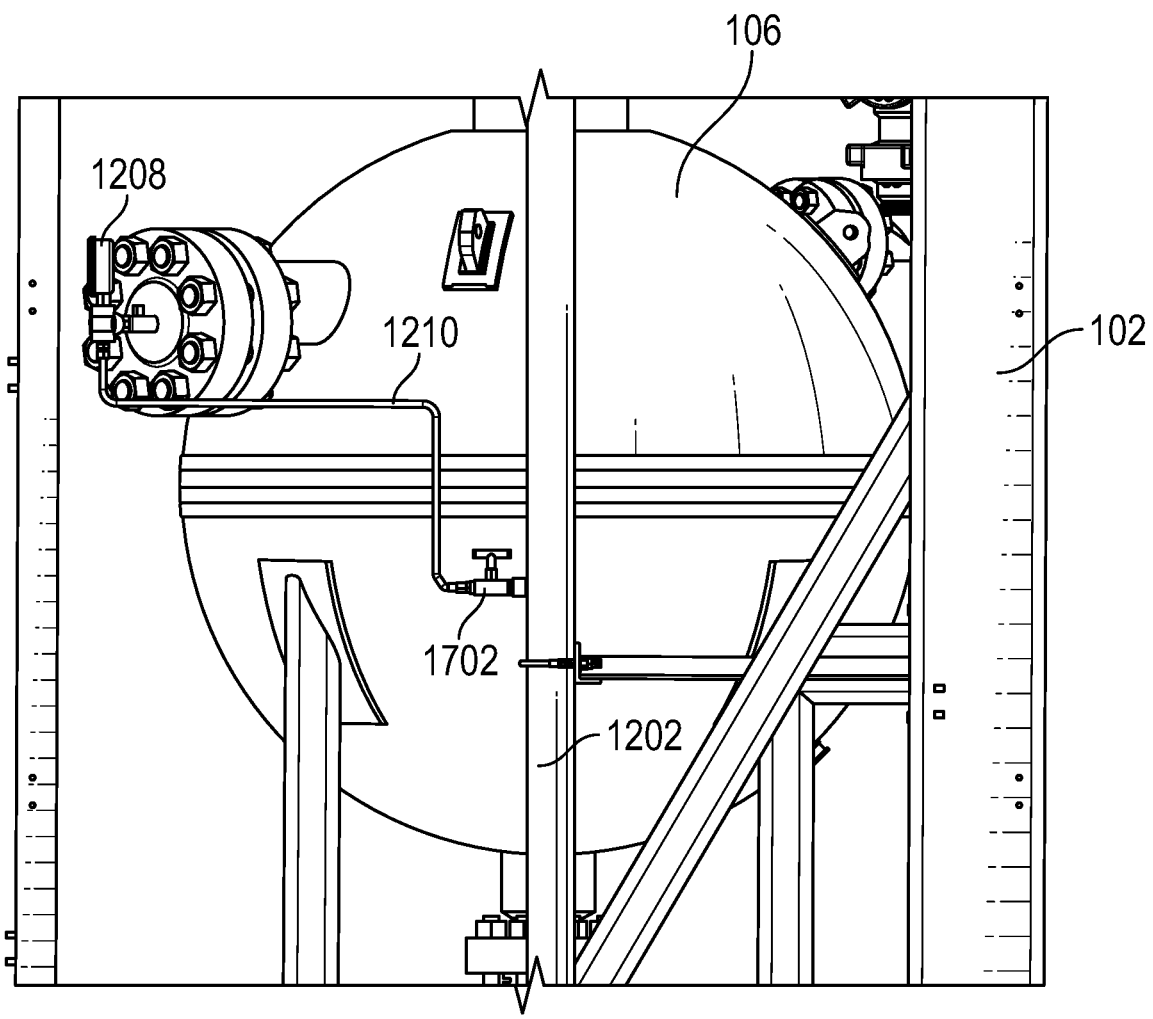
FIG. 17 illustrates a spherical separator useful with embodiments utilizing the present inventions.

As can be seen in FIG. 12, the embodiment illustrated as system 1200 does not utilize the recycle lines discussed with respect to system 100. Instead, system 1200 utilizes a pressure equalization system comprising an equalization line 1210, which may be, for example, a ½ inch conduit, that communicates from the interior of the spherical separator 106 to a region above the cyclone module 204. The equalization system preferably comprises a metering valve 1702 or other type of adjustable orifice that is configured to adjust the flow or pressure equalization between the spherical separator and the centrifugal separator. As shown in FIG. 17, the metering valve 1702 may be connected to the liquid/vapor outlet line 1202. In practice, it has been found that separation systems operate effectively with a pressure differential (between above the cyclone module and the spherical separator) of between about 20 to 80 psig, and most preferably between about 40 to 50 psig. Valve 1702 can be adjusted to adjust this differential pressure to a desired value or range. Valve 1702 also may comprise a pressure regulator that automatically adjusts the differential pressure to the desire value or range. In an instrumented embodiment, valve 1702 may be a controllable valve.

Particulate Measurement System. In addition to well production separation systems described above, we also have created systems that may be configured and structured to collect well production particulate matter, such as sand and/or proppants separated from fluids produced by subterranean oil wells, determine the amount of particulate, such as by weight. These particulate measurement systems may be manual, such as having a mechanical or electrical visual indicator(s) and valves, or may be active or automatic and configured, e.g., to transmit information to one or more remote locations, such as a website or smart device and receive control signals for controllable devices, such as valves..

In general terms, and with reference to FIGS. 18 through 21, our particulate measurement systems are preferably configured to removably couple to a tank or other reservoir (e.g., retention pond) into which fluids and particulates may be discharged and permanently or temporarily stored. Alternate embodiments of the particulate measurement system may be configured to straddle or otherwise discharge into a tank or reservoir without having to couple with the tank or reservoir. Regardless of the nature of the relationship between the particulate measurement system and tank or reservoir, it is preferred that a particulate measurement system may comprise a stationary subsystem or frame, a floating subsystem or measurement hopper, a hopper inlet system and a measurement processing subsystem. The floating subsystem may be configured to be operatively coupled to the stationary subsystem, such that the floating subsystem may move, or float, relative to the stationary subsystem based, at least in part, on the amount (e.g., weight) of particulate in the hopper. It is preferred that the relative movement comprises at least vertical movement, as defined by gravity, but movement also may be in other axes as desired. As discussed below, in a preferred embodiment, the stationary subsystem is configured to removably coupled to a tank, such as a frac tank, and most preferably a frac tank open at the top.

Figure 18A:
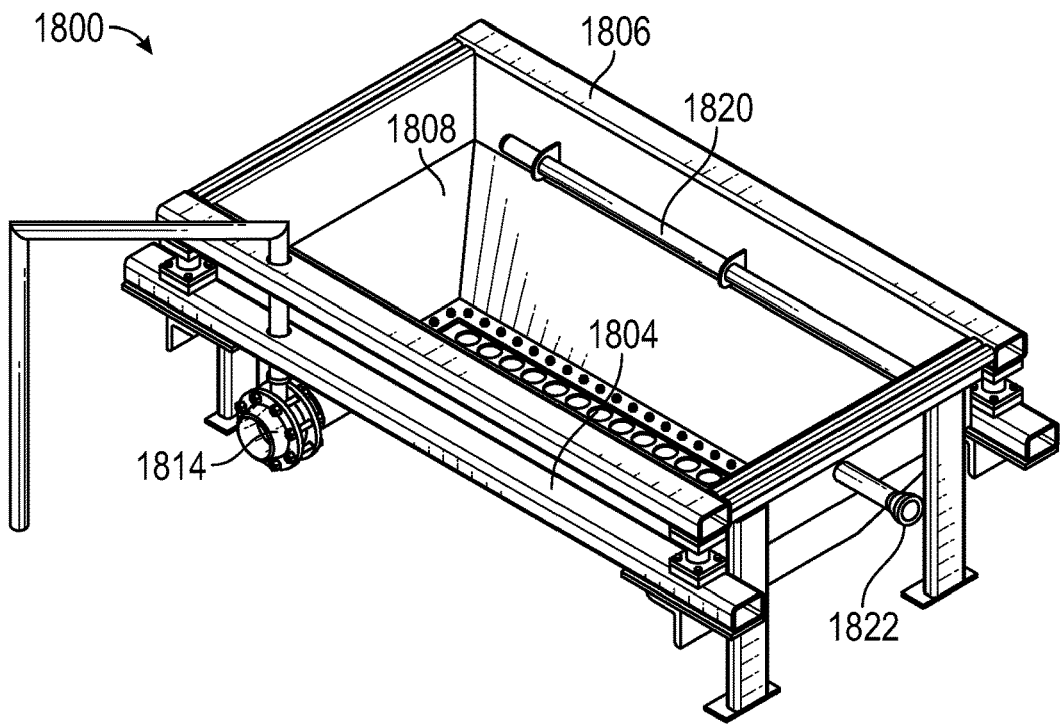
FIGS. 18A and 18B illustrate one of many possible embodiments of a particulate measurement system according to the present disclosure.
Figure 18B:
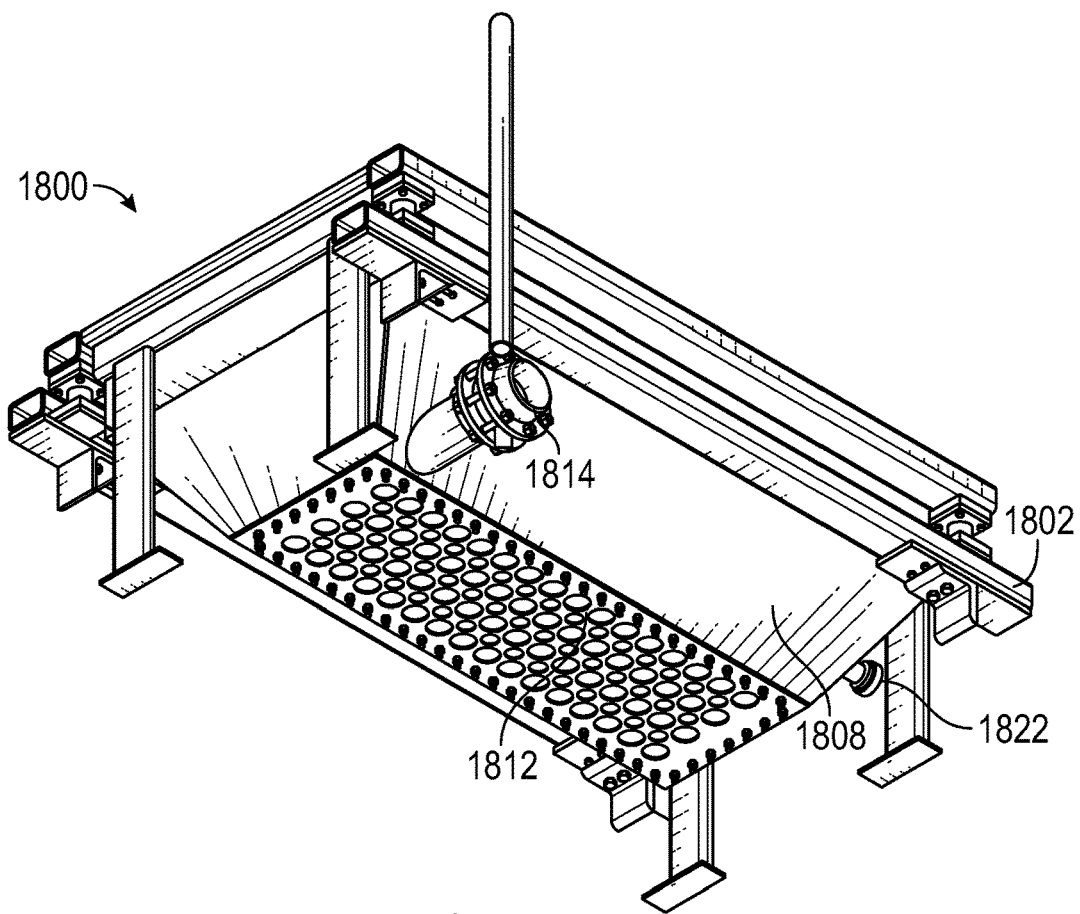

Referring to FIGS. 18A and 18B, a particulate measurement system 1800 is illustrated. The system 1800 may comprise a base or stationary subsystem 1804 comprising structural beams and legs and that is configured to react the weight of well fluid and related dynamic loads to a base, such a frac tank, ground, frame or other structure. Operatively coupled to the base 1804 is a hopper system 1806 configured to retain, e.g., temporarily, well particulates and to not retain liquid or gaseous well fluids. The hopper system 1806 comprises a hopper body 1808 that may embody any shape, but preferably embodies a slanted wall hopper that facilitates discharge of both particulates and liquid from the hopper.

The particulate system 1800 may comprise a liquid drain system, such as a perforated screen at the bottom of the hopper 1808, to allow liquids in the well fluids to drain unimpeded from the hopper 1808 but retain well fluid particulates. The system 1800 also comprises a particulate discharge valve 1814 that is configured to periodically empty the particulates from the hopper 1808. Additionally, or alternately, the hopper 1808 may comprise a trap door actuatable to dump the particulate at a predetermined or desired time into the tank.

The hopper system 1806 is preferably coupled to the base 1804 with one or more guides 1816 that are configured to support and align the hopper system relative to the baes 1804 and allow movement of the hopper 1806 relative thereto. The guides may comprise telescoping tubes or other such structures. In a preferred embodiment, one or more of the guides 1816 comprise load or force transducers, such as electronic load cells. Alternately, one or more load transducers may be coupled to the base 1804 or between the base 1804 and hopper 1806 to transduce the weight of the particulate captured by the hopper 1808. These one or more transducers may be configured to generate a signal or signals representative of the amount of matter, such as weight of particulates, in the hopper 1808 at any point in time, or in real time or quasi-real time. These signals may be communicated to a processor configured to generate a value, such as weight (e.g., lbf) and to display the value. For example, and not limitation, the processor may be located on the system, such as coupled to the stationary subsystem, and may be configured, such as by a wireless communication protocol (e.g., Bluetooth or near field) to display the value on a nearby smart device. Alternately or additionally, the processor may be located remotely from the system and tank. The processor may comprise an Internet website supported by servers and software, a programable logic controller, an ASIC, a computer, or the like.

Rather than electronic weight transducers, the system 1800 may comprise a mechanical weight indicating device such as a scale or balance arm, so that the weight of particulate matter in the hopper 1808 can be determined as desired. A preferred embodiment comprises one or more electronic load transducers operatively coupled to an electronic display associated with the system 1800. The display provides a continuous readout of the hopper 1808 weight and allows an operator to "hold" a weight value, reset the display and reset the tare weight. Another preferred embodiment comprises one or more electronic load transducers operatively coupled to a wireless transceiver that allows a smart phone or tablet to receive data from the one or more transducers. A software application reside on the smart phone or tablet can provide a continuous readout of the hopper 1808 weight, allow an operator to "hold" a weight value, reset the display and reset the tare weight.

Also illustrated in FIGS. 18A and 18B is a hopper flush system 1820 that may comprise a pipe located along one or more of the internal portions of the hopper 1808. The flush system 1820 also comprises an inlet 1822 to which a source of flushing fluid, such as fresh water, produced water or brine may be connected. It will be appreciated that the flush system can be utilized to facilitate removal of the collected particulates from the hopper 1808 through the discharge valve 1814, preferably after the particulates have been measured, e.g., their weight determined.

Figure 21A:
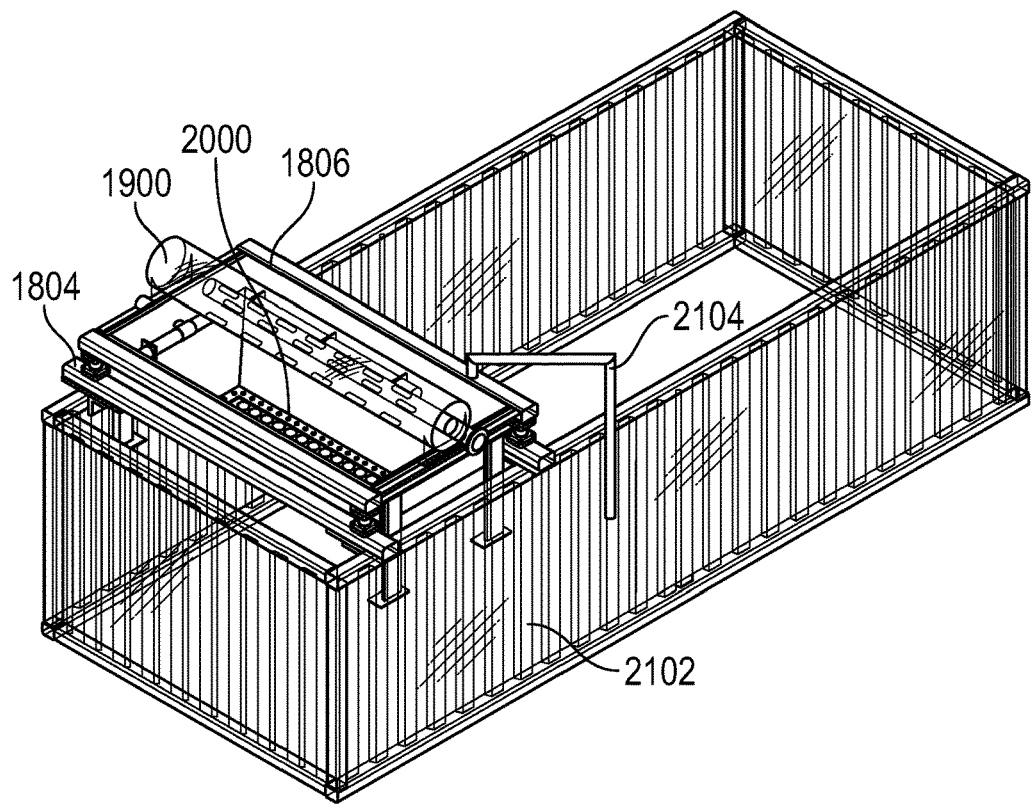
FIGS. 21A and 21B illustrate a fluid outlet system useful with the particulate measurement systems of the present disclosure.
Figure 21B:
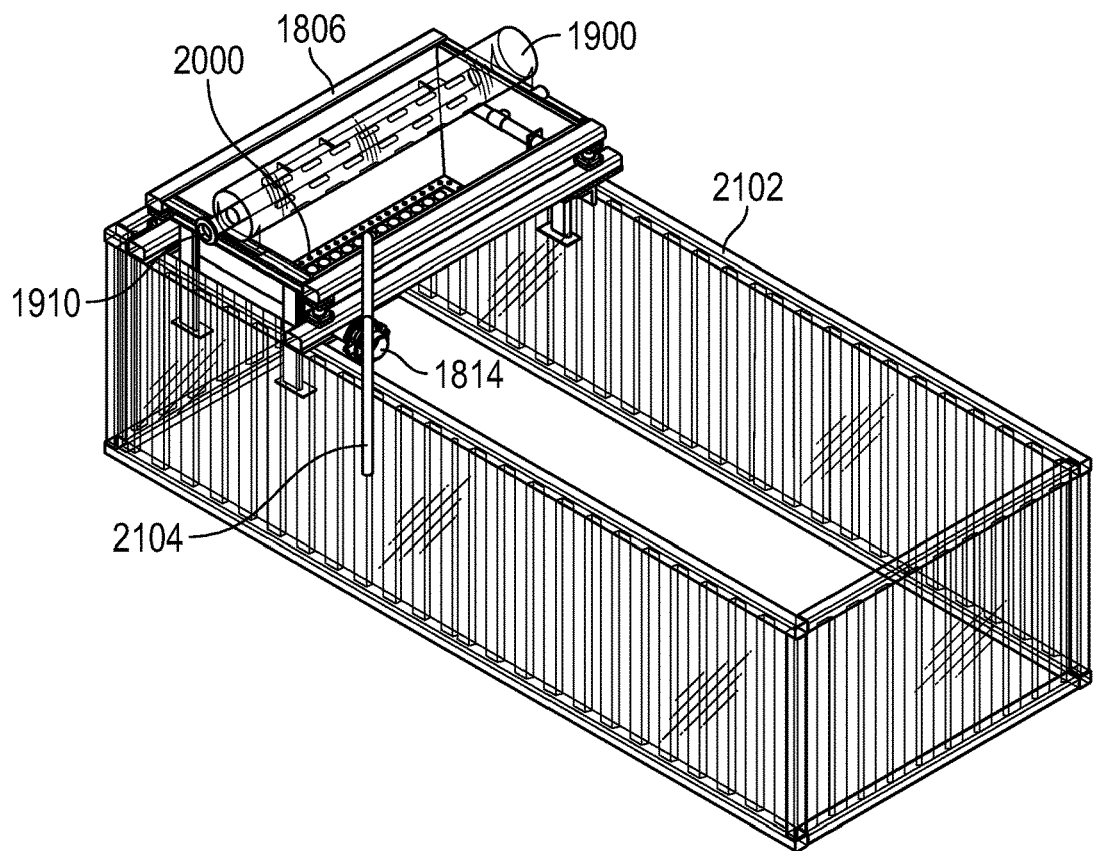

Referring to FIGS. 21A and 21B, the particulate measurement system 1800 also may comprise, and preferably comprises an inlet system 2102 configured to direct the incoming well fluids into the hopper 1808, and also preferably configured to dissipate some of the energy, e.g., mass flow rate, of the incoming fluid before the fluid (particulates and liquids) enters the hopper 1808. The inlet system 2102 may be considered part of hopper system 1806, the base 1804, or may be separate from either. Preferably, the inlet system 2102 is part of the base 1804 so that its functioning does interfere with the hopper system 1806.

Figure 19:
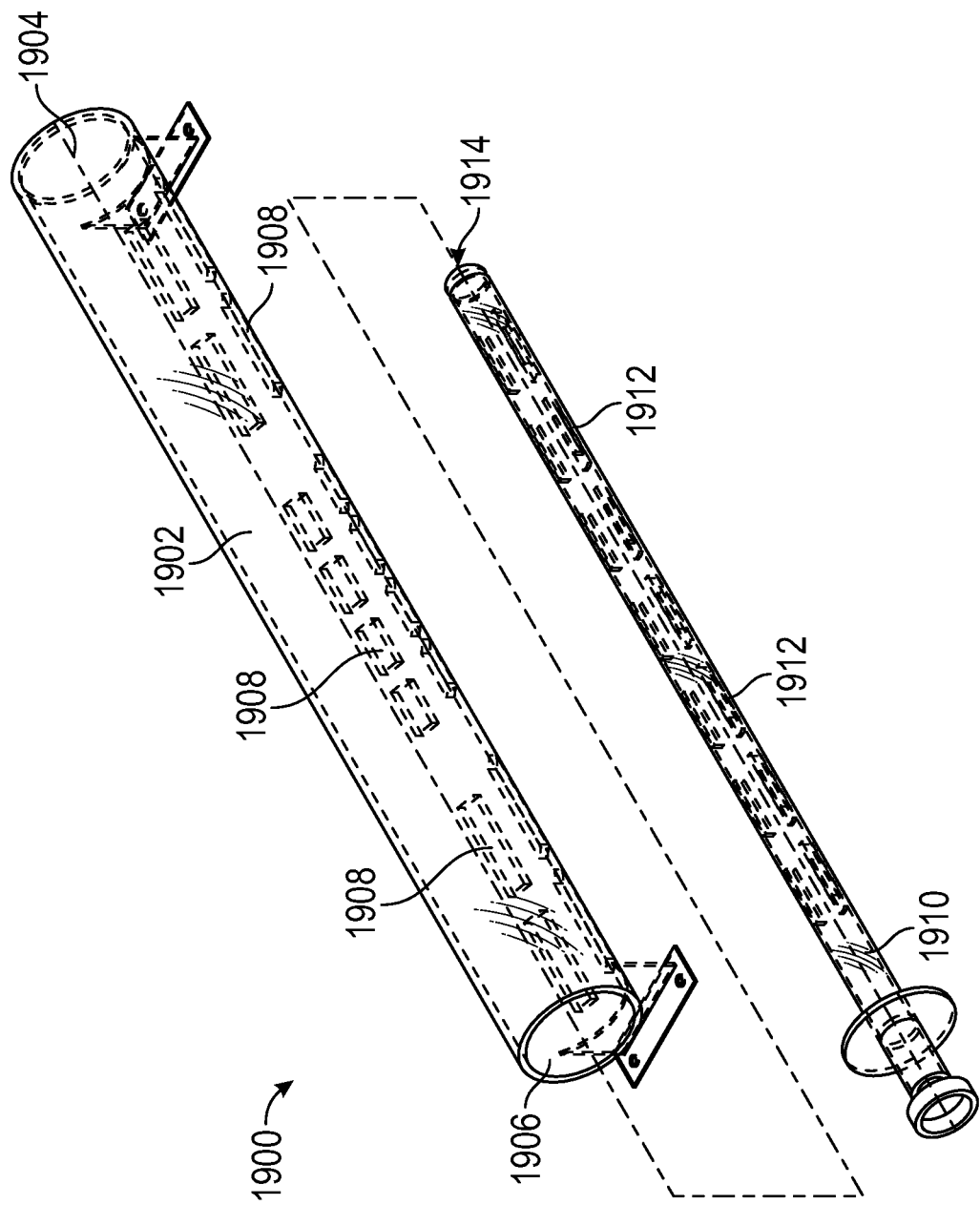
FIG. 19 illustrates an embodiment of an inlet system useful with embodiments of a particulate measurement system according to the present disclosure.

FIG. 19 illustrates one of many possible embodiments of an inlet system 1900, which may comprise an outer shell 1902 having a closed end, an inlet pipe opening 1906, and fluid outlets 1908. The inlet system 1900 also may comprise an inlet conduit or pipe 1910 configured to be housed by, and preferably centered within, the outer shell 1902. The inlet pipe comprises fluid outlets 1912, which may or may not include an outlet in end 1914. The size, shape, and number of the openings in the shell 1902 and inlet pipe 1910 are preferably based on the expected size and/or shape of the particulates expected from the well. In other words, it is desired that the outlets be configured such that the largest size particulate expected from the well will pass through the inlet pipe outlets 1912 and the shell fluid outlets 1908 and into the hopper 1808.

For installations where the incoming flow rate of well fluids is high (i.e., where it would cause well liquids and/or particulates to splash or rebound out of the hopper 1808), it is preferred that the shell outlets 1908 and pipe outlets 1912 be oriented substantially opposite each other as illustrated in FIG. 19. For example, the shell outlets 1908 may be oriented in a downward direction opening directly into the hopper 1808, and the pipe oriented within the shell 1902 so that the pipe outlets 1912 face up toward the inner top surface of the shell 1902. In this configuration, the incoming well fluid will exit the inlet pipe 1910 and impact the inner surfaces of the shell 1902. The liquids and particulates will flow out of the shell 1902 through outlets 1908 and into the hopper 1808. Also, it is preferred, but not required, that the inlet system 1900 comprise a manway or clean out port (not shown) in the shell 1902 to facilitate cleaning out the inside of the shell 1902.

If the flow rate of the incoming fluids is sufficiently low that the well fluid does not splash out of the hopper system 1806, the inlet system 1810 may not need to be configured to reduce the flow rate of the incoming fluid. For example, a low velocity inlet system 1900 may comprise just an inlet pipe 1910 oriented such that the pipe outlets 1912 opening directly to the hopper 1808.

Figure 20A:
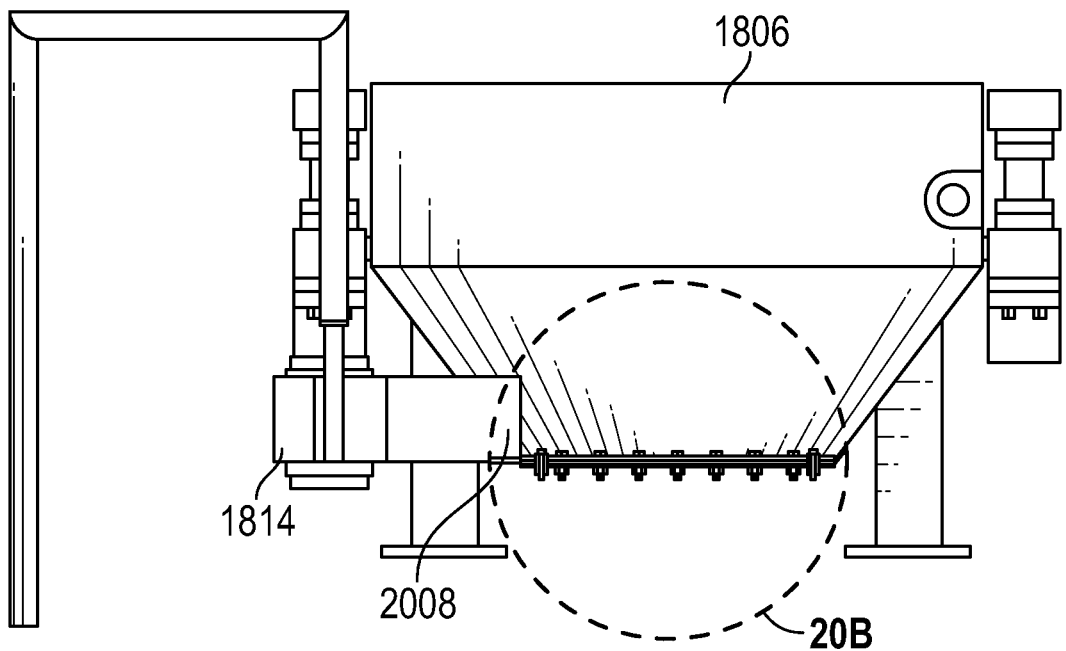
FIGS. 20A and 20B illustrate alternate views of the particulate measurement system shown in FIGS. 18A and 18B according to the present disclosure.
Figure 20B:
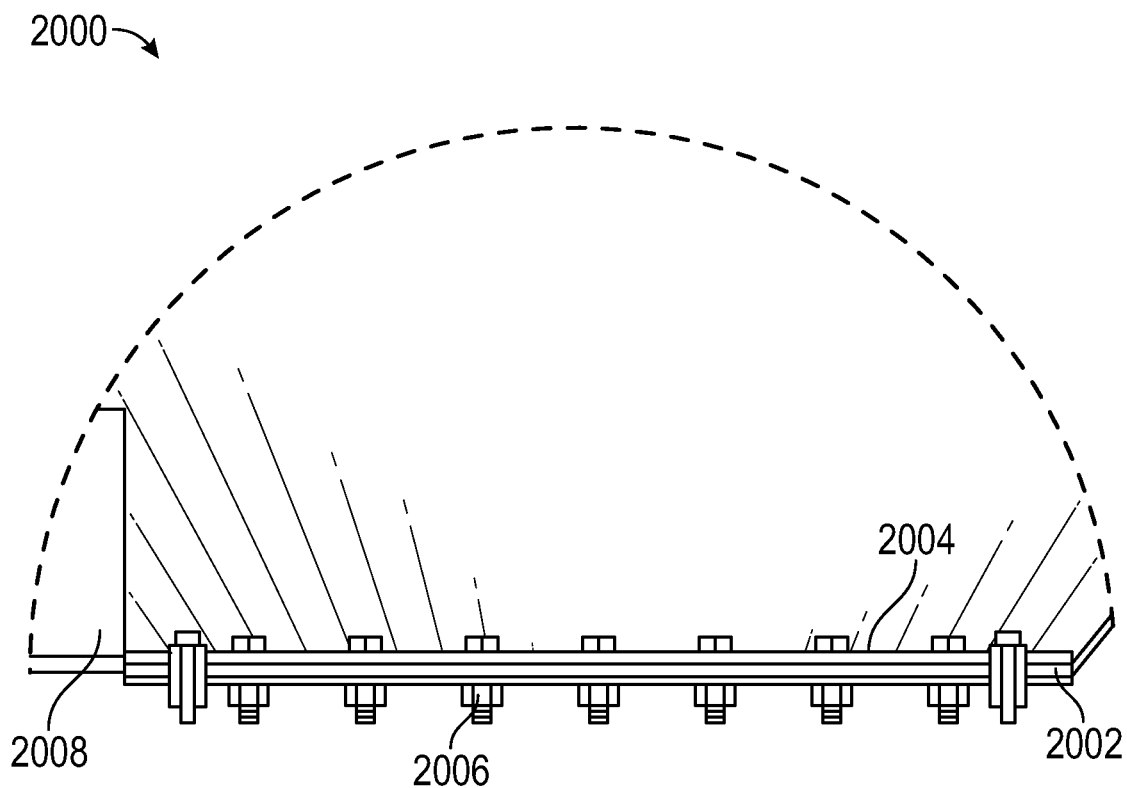

FIGS. 20A and 20B illustrate a preferred liquid drain system 2000 useful with particulate measurement systems described herein. As shown in FIG. 20A, the bottom of the hopper system 1806 may comprise a perforated base 2002 comprising a plurality of fluid openings or perforations (see FIGS. 18A and 21B) configured to let liquid pass therethrough. The perforated base 2002 may have the maximum amount of "open" area for drainage, so long as the perforated base 2002 has sufficient structure to hold the weight of the well fluids (liquids and particulates) and any additional weight (force) generated by dynamic loading, such as the inlet velocity of the well fluid.

Coupled to the perforated base 2002 may be one or more screens, meshes or sieves 2004 configured to let liquid pass therethrough, but not allow particulates to pass. Of course, the size of the screen (i.e., the size of the openings in the screen) is matter of design choice based on the size of the particulates desired to be measured by the system 1800. It is preferred that that the screen 2004 comprise a system, such as an outer frame 2006, that allows the screen 2004 to be easily removed from the system 1800 and replaced. For example, if the size of the expected particulates changes, or if the size of the particulates to be captured is changed, the screen/frame system can be easily removed and replaced with a screen system of different size. It is preferred that the screen is bolted or otherwise removably yet securely coupled to the perforated base 2002 or hopper system 1806.

FIGS. 21A and 21B illustrate a particulate measurement system 1800 removably coupled to the upper portions of a frac tank 2102. As can be seen the system base 1804 may rest on the upper portions of the tank 2102 legs 2104 positioned either inside or outside of the tank 2104. It will be appreciated that a forklift or crane may be used to place the system 1800 on the tank 2102. In the embodiment illustrated in these figures, liquid my drain from the hopper 1808 and be collected by the tank 2102. Particulates that cannot pass through the liquid drain system 1812 are retained in the hopper 1808 until they are flushed from the hopper 1808 into the tank 2102 through discharge valve 1814.

As a non-limiting example of how a particulate measurement system utilizing the inventions describe herein may operate, a particulate slurry, such as from an embodiment of the separation systems described herein, may be directed to the particulate measurement system by suitable rigid or flexible piping, preferably flexible piping, and pumps. The slurry may enter the inlet to the particulate measurement system and be discharged either directly into the hopper or into the annular region of the inlet system and then into the hopper of floating subsystem. As described, the hopper comprises a mesh, openings, or other type of ports configured to retain a predetermined size or size range of particulates, yet allow liquid, such as water to pass through into the tank.

At some point, the hopper will approach capacity of retained particulates. The inlet slurry may then preferably close, such as by actuating a valve, and the liquid in the hopper allowed to drain into the tank. It will be appreciated that once the inlet is closed, the output, such as a real time output, from the one or more load cells likely will demonstrate a decreasing hopper weight with time as the liquid drains out and into the tank. For processor based systems, the processor may be programmed to determine when all or most of the fluid has drained from the hopper, such as by analyzing the rate of change of weight, and/or the derivative of the rate of change of hopper weight. Depending on the desired accuracy, the processor can be configured to report a value representing the amount, such as the weight, of particulates, such as sand, in the hopper.

Once the value has been determined, the particulates may be flushed from the hopper through a discharge valve. Flushing may be benefitted by supplying fluid, such as water or tank liquid, to wash the particulates out through the discharge valve. It will be appreciated that the flushing fluid is preferably allowed, but not required, to drain into the tank. Once the hopper is flushed, and the flushing fluid drain out of the hopper, the processor can establish a new tare weight for the hopper or compare the hopper weight to the previous hopper weight. The discharge valve is closed, and the inlet valve opened, and the process begun again. When the tank is filled with fluid, the system can be lifted off the tank and set on the ground on legs that are a part of the stationary subsystem. Alternately, the system can be placed on another tank and the process started again. Still further, and preferred, the tank can be periodically drain.

Having described a processor-based system, those of skill in the art will appreciate how a manual system comprising a mechanical scale or lever balance may be operated.

Well Fluid Management System. Turning now to another of our inventions, we have created comprehensive, controllable well fluid management systems configured to separate particulate matter from well fluid, determine an amount of particulate matter in the produced fluid, and determine one or more properties of the liquid and/or gas components of the well fluid. Data from each subsystem may be communicated to a controller, and the controller may be suitably configured to control one or more of the subsystems, such as by remote input or algorithm.

Figure 22:
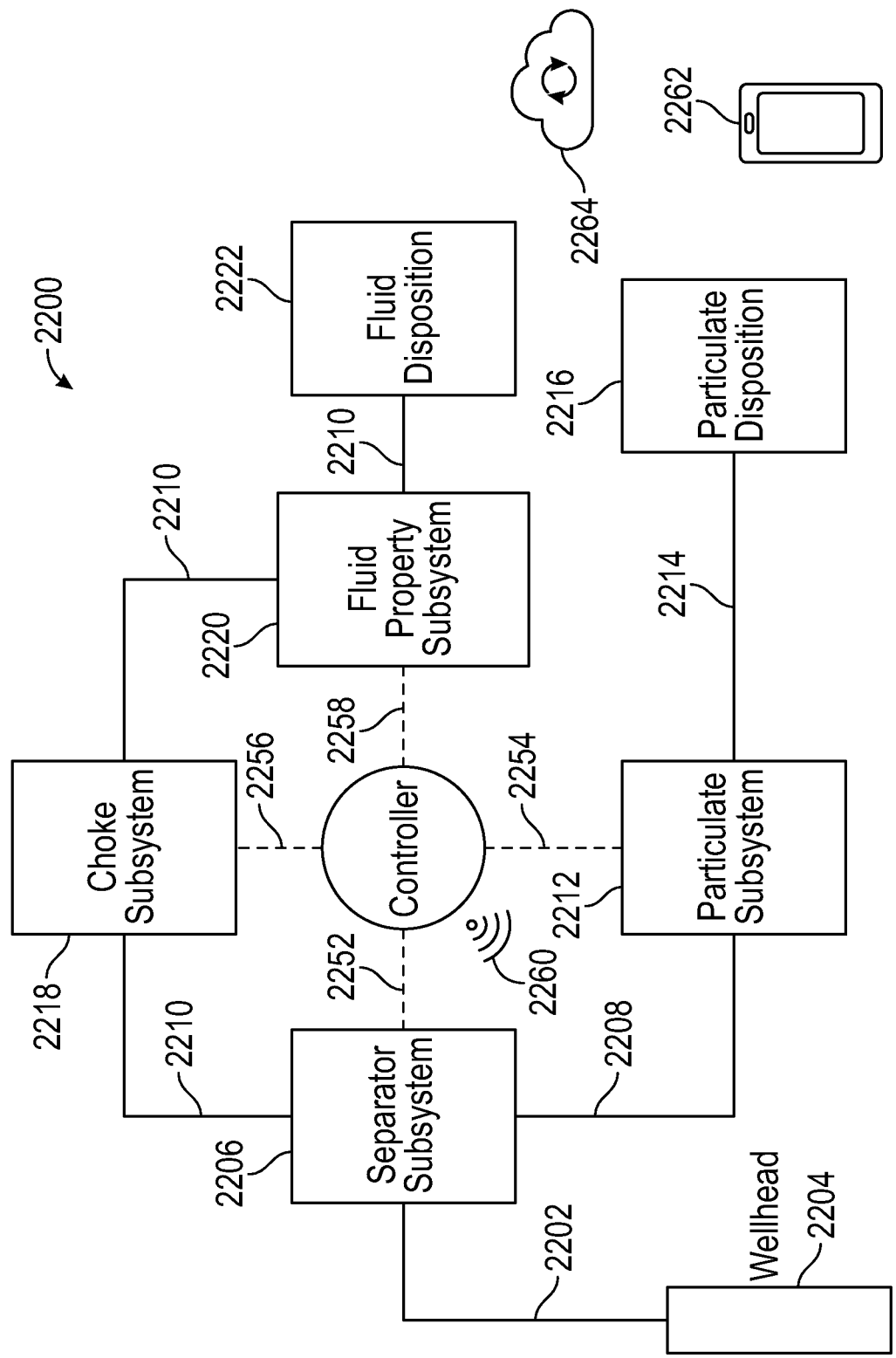
FIGS. 22 illustrates a flow and control diagram of one of many possible embodiments of a well fluid management system according to the present disclosure.

FIG. 22 illustrates a block diagram of a particulate management system 2200 in which fluids 2202 are directed from a wellhead 2204 to a separator subsystem 2206. The separator system 2206 is configured to separate sand and other well particulates 2208 from other well fluids 2210 (e.g. water, liquid hydrocarbons, gaseous hydrocarbons) and pass particulates 2208 out of the subsystem 2206. Separator system 2206 preferably comprises one of the many possible embodiments of a particulate separation system as described herein with respect to FIGS. 1-17. However, separator subsystem 2206 is not limited to those particular embodiments and may comprise any of the conventional or unconventional particulate separation systems or sand knock out systems currently available, including, but not limited to, for example, the Sandtinel Defender series of sand separators.

Particulates separated from the well fluid by separator subsystem 2206 are communicated, such as through piping, to a particulate measurement subsystem 2212. The particulate subsystem 2212 is configured to determine one or more properties or characteristics of the particulates, such as weight, mass, or volume, separated from the well fluids. This property or characteristic may be representative of a property or characteristic of particulates in the well fluid 2202. It is preferred, but not required, that the particulate subsystem 2212 may comprise one of the many embodiments of the particulate measurement systems described herein with respect to FIGS. 18A-21B. Once the particulate subsystem 2212 has determine the one or more desired properties or characteristics of the well fluid particulates 2208, such particulates 2214 may be passed from the subsystem 2212 for disposal or other disposition 2216. It should be noted that particulate stream 2208 likely comprises a slurry, and particulate stream 2214 downstream of subsystem 2212 may, and preferably is, different from stream 2208, at least in fluid content.

It will be appreciated that determining an amount, such as weight, of particulates contained in the well fluid is useful for establishing, confirming, or predicting well production parameters and other well production factors.

Referring back to separator subsystem 2206, fluid 2210, such as liquids and gases, are also separated from the well fluid 2202 and are preferably passed to a choke subsystem 2218 configured to choke or reduce the pressure of the fluids 2210 to a desired or predetermined level. Thereafter, and optionally, the choked fluid 2210 may be passed to a fluid property subsystem 2220 configured to determine one or more properties or characteristics of the fluid 2210. For example, and not limitation, fluid property subsystem 2220 may be configured to determine density of the fluid 2210, density of components of the fluid 2210, water content, hydrocarbon content, alcohol content of the fluid 2210, and/or weight volume or mass volume of the fluid and components of the fluid 2210. Thereafter, fluid 2210 may be passed to devices or processes 2222 for disposition of the fluid 2210

As will be discussed with respect to one of many possible embodiments described below, it is preferred, but not required, that the well fluid management system 2200 be configured with a controller 2250. As shown in FIG. 22, controller 2250 may communicate, unidirectionally or bidirectionally, wirelessly or wired, with one or more of the subsystems. The controller 2250 may be configured to process sensor data from one or more of the subsystems, and to control one or more devices in one or more subsystem. For example and not limitation, the controller 2250 may be configured to monitor the separator subsystem 2206, and to discharge particulate matter or particulate slurry 2208 from the subsystem by actuating, for example, a dump valve, when a data value, such as a load cell signal, reaches or exceeds a predetermined value. Similarly, the controller may be configured to monitor the choke subsystem 2218 and adjust one or more controllable valves to establish the appropriate or desired downstream fluid pressure.

The controller 2250 may be configured to monitor and/or control the fluid property subsystem 2220 and use the sensed or determined properties or characteristics of the fluid 2210 to adjust or control other aspects of the system 2200. The controller 2250 also may be configured to monitor the particulate subsystem 2212, such as the weight or volume of particulates captured from the slurry 2208, and to discharge the captured particulates at a predetermined time or value, such as operating a discharge valve and/or operating a flush system.

It is preferred, but not required that the controller 2250 be configured to communicate with remote devices or sites, such as smart phones, tablets, laptop computers or desktop computers 2262, and/or Internet 2264. It is contemplated that system 2200 may be configured to communicate, such as wirelessly over a cell, satellite or Wi-Fi infrastructure, to and from one or more websites on the Internet 2264, such as a well operator's website. The controller 2250, or individual subsystems in system 2200 may communicate data, such as operating conditions, valve position, alarm conditions and other information related to the operation of the system 2200. The information also may be communicated to smart devices 2262 such as through a platform specific application, or simply through access to the website. Commands may be sent to the controller from the website and/or from the smart device 2262 to alter, adjust, modify or implement any of the actions previously described, such as, but not limited to, discharging particulates from separator subsystem 2206, discharging particulates form particulate subsystem 2212, opening, closing or adjusting valves in separator system 2206, as described below.

It is contemplated that controller 2250 may be configured, such as by one or more algorithms stored in memory, to automatically control operation of the system 2200, with remote Internet 2264 or smart device 2262 control or interaction restricted to monitoring, and emergency shut down or intervention. Alternately, or additionally, controller 2250 may be configured, such as by one or more algorithms stored in memory to provide fully automated, partially automated or direct control of the system 2200 and/or the individual subsystems by an operator at the well site 2204. It will be appreciated that controller 2250 may be outfitted with necessary human interface devices, which include a smart device. Alternately, or additionally, controller 2250 may be configured, such as by one or more algorithms stored in memory to implement commands from remote devices, such as the Internet 2264 or smart device 2262. In such embodiments, the remote device may provide fully automated, partially automated, or direct control of system 2200 and/or the individual subsystems.

Figure 23A:
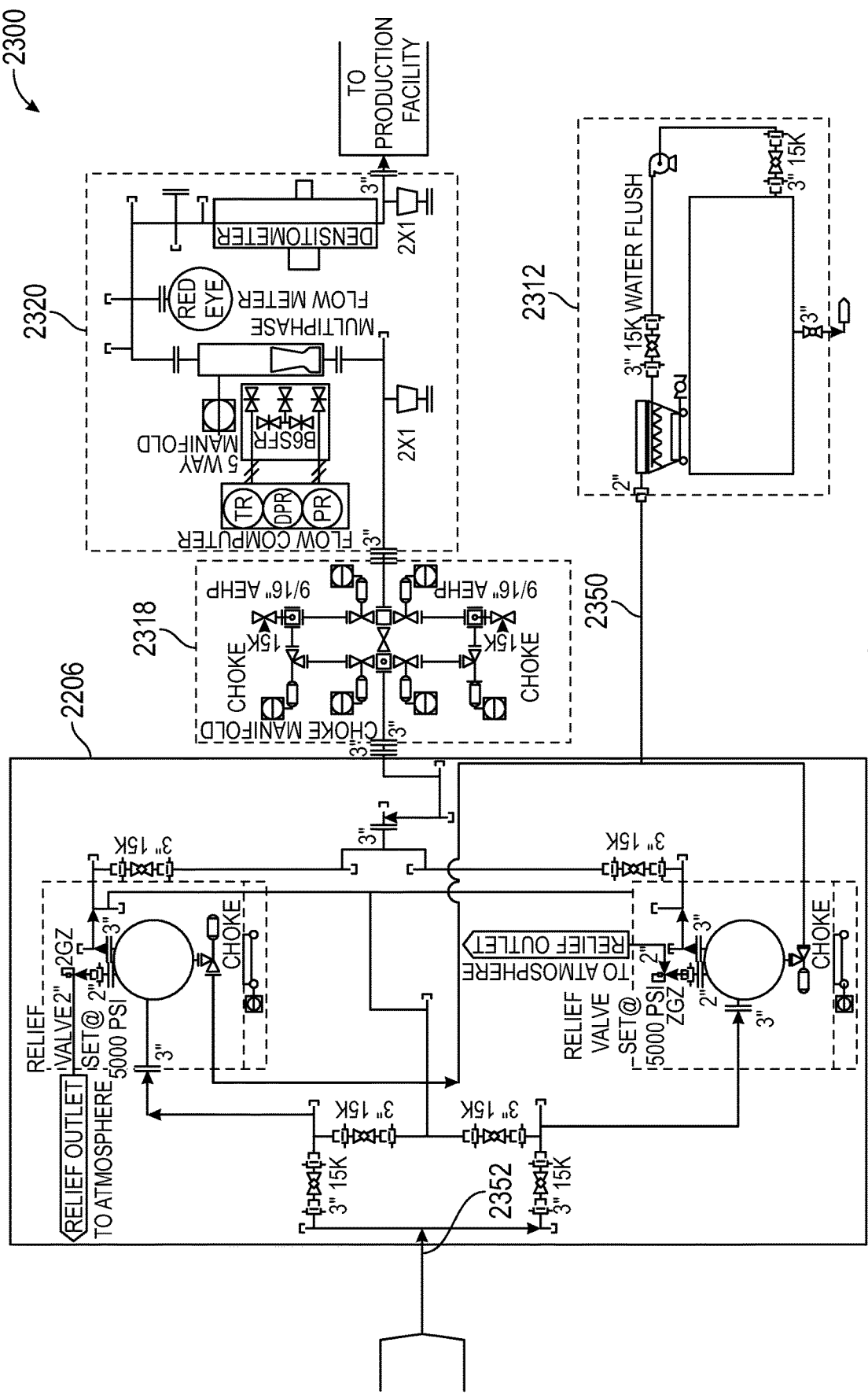
FIGS. 23A through 23C illustrates a piping and instrumentation diagram of one of many possible embodiments of a well fluid management system.
Figure 23B:
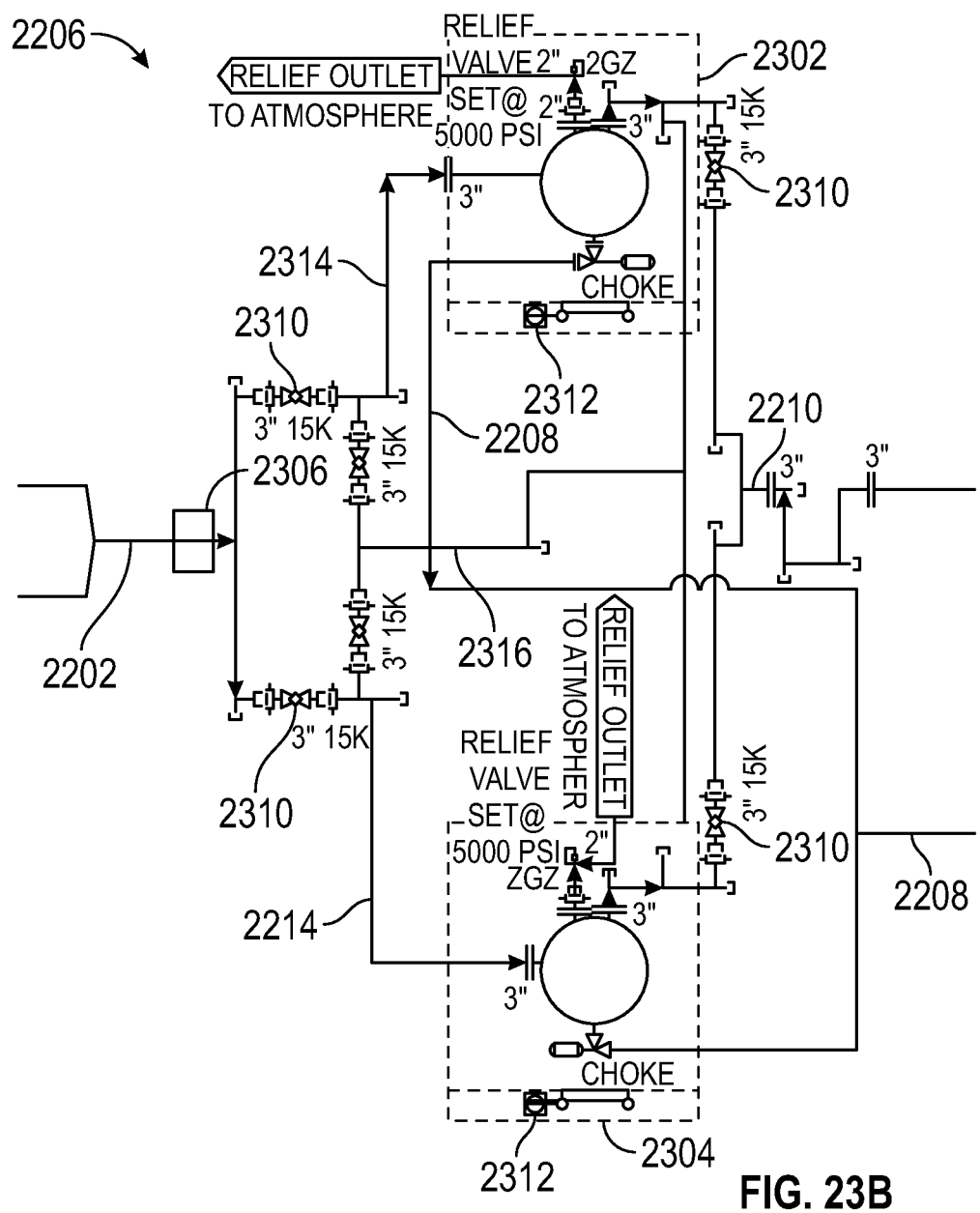
Figure 23C:
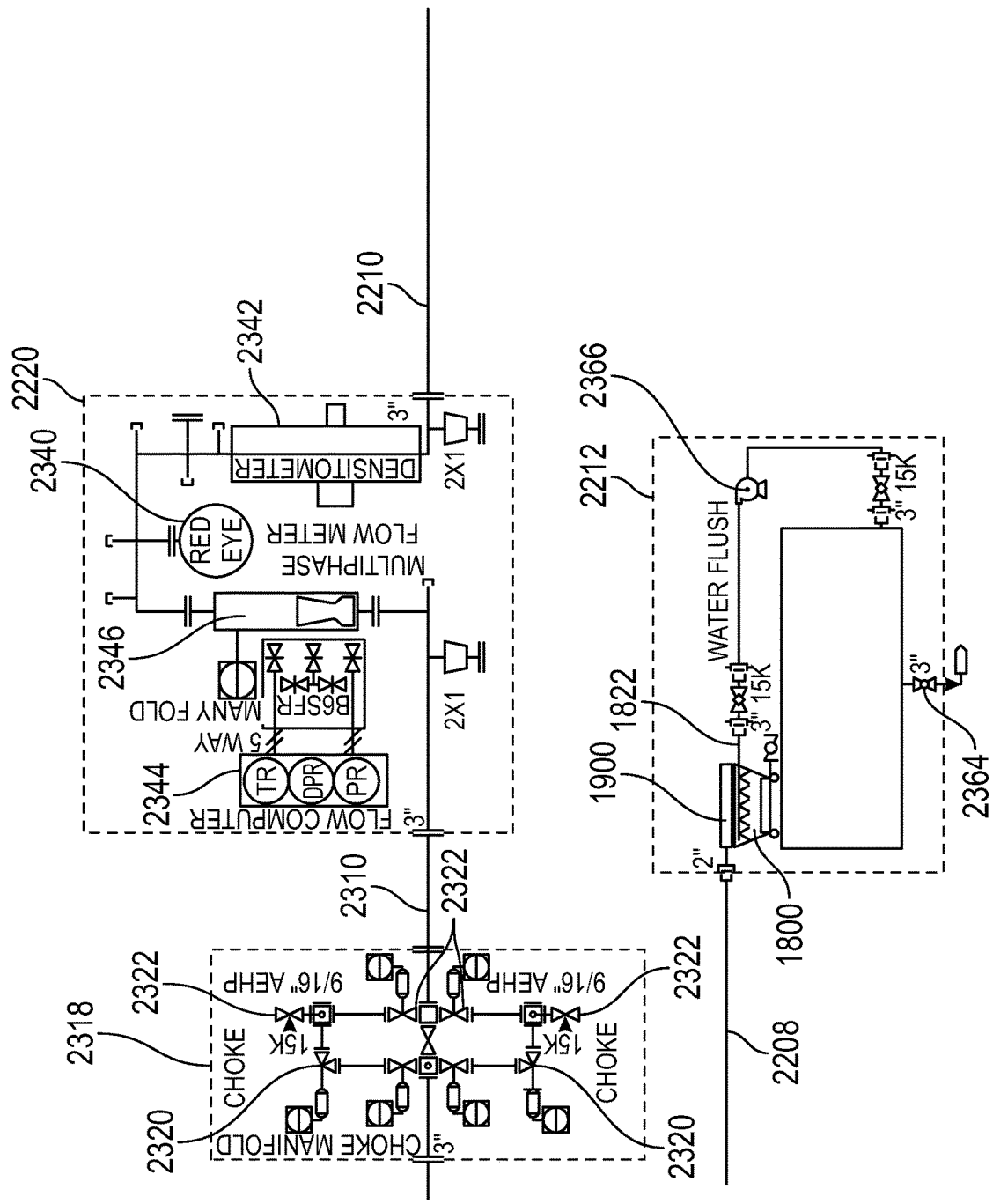

FIGS. 23A-23C illustrate aspects of one of many possible embodiments of a well fluid management system 2300. FIG. 23A illustrates a system 2300 comprising a separator subsystem 2206, a choke subsystem 2218, a fluid property subsystem 2220, and a particulate subsystem 2212, all operatively plumbed together. FIG. 23B illustrates a separator subsystem 2206 comprising two individual particulate separators 2302, 2304, such as those described herein with respect to FIGS. 1-17, or other sand separators known in the art. Fluid 2202, including particulates, from the well, may pass first through a sand monitor 2306, then through a series of valves, preferably controllable plug valves 2310, configured to direct well fluid 2202 to either or both of the separators 2302, 2304, or bypass 2316 both separators. It is preferred that some or all of the valves in system 2206 comprise position indicating controllable valves. Each separator 2302, 2304 comprises a particulate or slurry discharge 2308, which is preferably a controllable valve. Each separator also preferably comprises a load cell 2312 or other load or mass sensing device. In certain embodiments, the discharge valve 2308 is controlled by the output of the load cell 2312. For example, when the weight of the separator 2302, 2304, reaches a predetermined level or amount, a signal causes the discharge valve 2308 to open and discharge the particulate slurry 2308 from the separators. Alternately, the weight of the separator may control the amount of openness of the discharge valve. Each separator 2302, 2304 also is configured to pass separated fluid 22310 through controllable valves 2310 as shown in FIG. 23A.

FIG. 23C illustrates an embodiment of a choke manifold 2218 useful with the well fluid management systems described herein. Choke subsystem 2218 preferably comprises redundant controllable choke valves 2320 plumbed with multiple controllable gate valves 2322 as illustrated. Either or both choke valves 2320 may be used during operation. Either choke valve 2320 may be isolated for repair or maintenance without taking the entire choke subsystem offline. The choke valves 2320 may be pressure or electrically controlled, and the gates valves preferably may be electrically controlled.

FIG. 23C also illustrates an embodiment of a fluid property subsystem 2220, which preferably comprises one, more or all of a multiphase flow meter 2346, a flow computer 2344, a water cut sensor 2340 and/or a densitometer 3342. A suitable multiphase flow meter is available from Weatherford as its Alpha VSRD multiphase flow meter comprising a Red Eye® series water cut meter and a gamma densitometer. It is preferred that the fluid property subsystem communicate its data to controller 2350 in substantially real time (i.e., accounting for latency delays and the like).

FIG. 23C also illustrates an embodiment of a particulate measurement system 2212, comprising a replaceable or movable tank 2368 and a particulate measurement system 2360, which may be any of the systems described herein with respect to FIGS. 18-21. Particulate discharge valve 2362 is preferably controllable, such as by controller 2950. Alternately, system 2360 may comprise a trap door that allows particulate to be discharged into the tank 3468, after measurement of particulate is completed. The subsystem 2212 also may comprise a fluid pump 2366 configured to circulate fluid from the tank 2368 for flushing particulates form the hopper.

Figure 24:
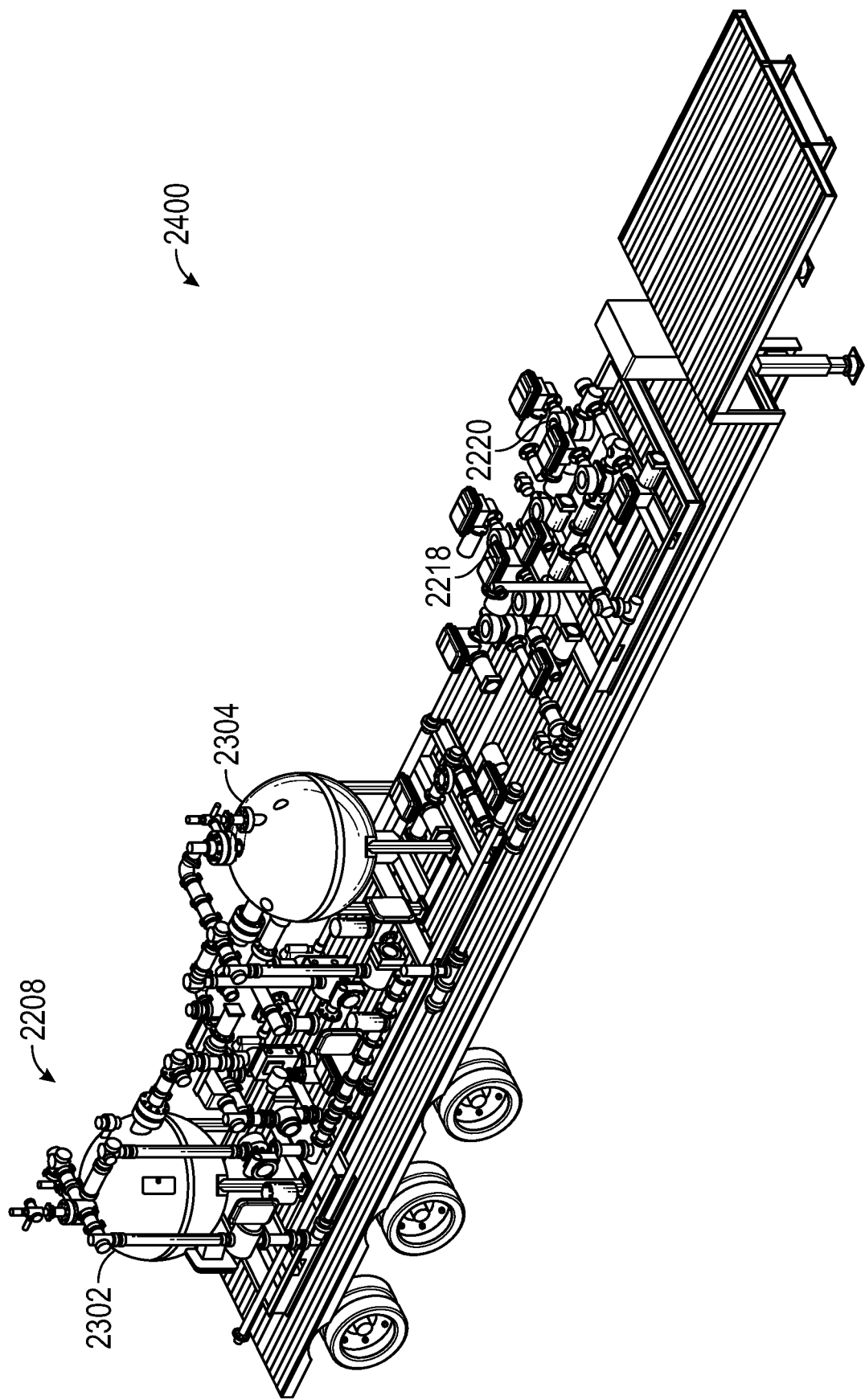
FIG. 24 illustrates a mobile, trailer-based well fluid management system according to the present inventions.

FIG. 24 illustrates a mobile system 2400 comprising a mobile trailer 2402. a separation subsystem 2206, a choke subsystem 2218 and a fluid property subsystem 2220 may be mounted and configured for travel on highways and operably connected as described herein. A second trailer may be provided to transport a particulate measurement subsystem 2212 and tank, which can be plumbed to the systems on the first trailer as described herein.

Other and further embodiments utilizing one or more aspects of the inventions described above can be devised without departing from the spirit of Applicant's invention. Further, the various methods and embodiments of the methods of manufacture and assembly of the system, as well as location specifications, can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to protect fully all such modifications and improvements that come within the scope or range of equivalent of the following claims.

What is claimed is:

1. A well production particulate measurement system, comprising:
   a frame configured to removably engage an upper portion of a tank;
   a hopper coupled to the frame so that the hopper can move relative to the frame along at least a gravitational axis, the hopper configured to continually discharge a liquid component of the well production into the tank to which the frame is engaged, and the hopper configured to receive and hold particulates in the well production and periodically discharge the particulates from the hopper;
   a well production inlet configured to receive the well production and discharge the particulates and liquid component into the hopper such that substantially all of the particulates and liquid are captured by the hopper; and
   a weight transducer coupled to the system and configured to determine a weight of particulates in the hopper.

2. The system of claim 1, wherein the tank is an open top frac tank.

3. The system of claim 1, wherein the hopper further comprises a perforated base and screen system configured to pass liquid from the hopper into the tank and to retain within the hopper particulates of a predetermined size.

4. The system of claim 2, wherein the system drains the liquid into the tank.

5. The system of claim 1, wherein the inlet comprises an inner pipe having a plurality of openings sized to pass particulates in the well fluid, the pipe surrounded by an outer shell having a plurality of openings sized to pass particulates in the well fluid, and wherein the openings in the pipe and the openings in the shell are not aligned.

6. The system of claim 1, wherein the weight transducer is a mechanical scale.

7. The system of claim 1, wherein the weight transducer is a load cell.

8. The system of claim 7, further comprising a visual display configured to receive information from the load cell and continuously display a weight of contents of the hopper.

9. The system of claim 7, further comprising a wireless transceiver configured to transmit and receive information from the load cell to a portable processing device configured to display a weight of contents of the hopper.

10. The system of claim 1, further comprising a hopper discharge port configured to periodically discharge particulates from the hopper.

11. The system of claim 10, wherein the system further comprises a flush system configured to provide a liquid to the hopper for flushing particulates from the hopper through the discharge port.

12. The system of claim 11, wherein the liquid used by the flush system is liquid pumped from the tank.

13. The system of claim 5, wherein the pipe openings are oriented to direct well production against an inner surface of the shell to dissipate energy in the well production before the well production exits the shell.

14. The system of claim 13, wherein the alignment of the openings ace openings is substantially opposite.

15. The system of claim 5, wherein the inlet is configured to reduce the velocity of well fluid entering the hopper to reduce an amount of well production particulates or liquids that splash out of the hopper.

16. A well fluid particulate measurement system, comprising:
   a frame configured to removably couple to an upper portion of a tank;
   a hopper coupled to the frame so that the hopper can move relative to the frame, the hopper configured to continually discharge a liquid component of the well fluid into the tank and the hopper configured to receive and hold particulates in the well fluid and periodically discharge the particulates from the hopper into the tank;
   a well fluid inlet system having an inlet port and at least one outlet port, the inlet system configured to discharge the well fluid into the hopper at velocity less than a velocity of the well fluid at the inlet port; and
   a weight measurement system operatively coupled to the hopper and configured to determine a weight of particulates in the hopper.

17. The system of claim 16, wherein the inlet system discharge velocity is sufficiently low that well fluid is prevented from splashing out of the hopper.

18. The system of claim 16, further comprising a particulate discharge port operatively coupled to the hopper.

19. The system of claim 18, wherein the particulate discharge port comprises a door at a bottom of the hopper.

20. The system of claim 18, wherein the particulate discharge port comprises a valve.

* * * * *